(12) United States Patent
Rentsch et al.

(10) Patent No.: US 10,465,074 B2
(45) Date of Patent: Nov. 5, 2019

(54) EARTH ALKALI CARBONATE, SURFACE MODIFIED BY AT LEAST ONE POLYHYDROGENSILOXANE

(71) Applicant: Omya International AG, Oftringen (CH)

(72) Inventors: Samuel Rentsch, Aarburg (CH); Fabio Ippolito, Oftringen (CH); Patrick A. C. Gane, Rothrist (CH)

(73) Assignee: Omya International AG, Oftringen (CH)

( * ) Notice: Subject to any disclaimer, the term of this patent is extended or adjusted under 35 U.S.C. 154(b) by 65 days.

(21) Appl. No.: 15/696,518

(22) Filed: Sep. 6, 2017

(65) Prior Publication Data

US 2017/0369710 A1  Dec. 28, 2017

Related U.S. Application Data

(63) Continuation of application No. 14/905,417, filed as application No. PCT/EP2014/067044 on Aug. 8, 2014, now Pat. No. 9,783,682.

(30) Foreign Application Priority Data

Aug. 26, 2013  (EP) ..................... 13181676

(51) Int. Cl.
*C09C 1/02* (2006.01)
*C08K 9/08* (2006.01)
*C08K 3/26* (2006.01)

(52) U.S. Cl.
CPC ............... *C09C 1/021* (2013.01); *C08K 9/08* (2013.01); *C01P 2004/62* (2013.01); *C08K 2003/265* (2013.01); *C08K 2201/005* (2013.01)

(58) Field of Classification Search
CPC ................................ C09C 1/021; C08G 77/12
See application file for complete search history.

(56) References Cited

U.S. PATENT DOCUMENTS

| | | | |
|---|---|---|---|
| 3,160,598 A | 12/1964 | Delfosse | |
| 4,407,986 A | 10/1983 | Nomura et al. | |
| 4,520,073 A | 5/1985 | Randolph et al. | |
| 4,810,305 A * | 3/1989 | Braun | C08K 9/06 106/404 |
| 5,827,906 A | 10/1998 | Metzemacher et al. | |
| 6,569,527 B1 | 5/2003 | Calhoun et al. | |
| 2002/0102404 A1 | 8/2002 | Nakai et al. | |
| 2004/0063816 A1 | 4/2004 | Bergstrom et al. | |
| 2007/0197707 A1 | 8/2007 | Hoppler et al. | |

FOREIGN PATENT DOCUMENTS

| | | |
|---|---|---|
| DE | 958830 | 2/1957 |
| EP | 0325114 A2 | 1/1989 |
| GB | 2336366 A | 10/1999 |
| GB | 2355453 A | 4/2001 |
| JP | 54162746 A | 12/1979 |
| WO | 9202587 A1 | 2/1992 |
| WO | 0020336 A1 | 4/2000 |
| WO | 0132787 A1 | 5/2001 |
| WO | 02055596 A1 | 7/2002 |
| WO | 02096992 A2 | 12/2002 |
| WO | 03082966 A1 | 10/2003 |
| WO | 2004031302 A2 | 4/2004 |
| WO | 2007078454 A2 | 7/2007 |
| WO | 2008077156 A2 | 6/2008 |
| WO | 2008125955 A1 | 10/2008 |
| WO | 2010 023144 A1 | 3/2010 |
| WO | 2011147778 A1 | 12/2011 |
| WO | 2011147802 A1 | 12/2011 |
| WO | 2013004621 A1 | 1/2013 |

OTHER PUBLICATIONS

Kroschwitz (Encyclopedia of Chemical Technology, 4th Ed., vol. 4, 1992, pp. 796-801).
The International Search Report dated Aug. 27, 2014 for PCT Application No. PCT/EP2014/067044.
The Written Opinion of the International Searching Authority dated Aug. 27, 2014 for PCT Application PCT/EP2014/067044.

* cited by examiner

*Primary Examiner* — Kuo Liang Peng
(74) *Attorney, Agent, or Firm* — Heslin, Rothenberg, Farley & Mesiti P.C.

(57) ABSTRACT

The present invention relates to an earth alkali carbonate-containing filler material having a volatile onset temperature of ≥350° C., which is at least partially surface modified by using at least one polyhydrogensiloxane for increasing the hydrophobicity and/or decreasing the moisture pick up, a process for preparing such a surface modified earth alkali carbonate-containing filler material, a fiber and/or filament and/or film and/or thread and/or breathable film comprising the surface modified earth alkali carbonate-containing filler material as well as an article comprising the surface modified earth alkali carbonate-containing filler material and/or the fiber and/or filament and/or film and/or thread and/or breathable film, preferably its use in polyester products.

19 Claims, No Drawings

EARTH ALKALI CARBONATE, SURFACE MODIFIED BY AT LEAST ONE POLYHYDROGENSILOXANE

CROSS-REFERENCE TO RELATED APPLICATIONS

This is a continuation of U.S. application Ser. No. 14/905,417, filed Jan. 15, 2016, which is the U.S. National phase of PCT Application No. PCT/EP2014/067044, filed Aug. 8, 2014, which claims priority to European Application No. 13181676.1, filed Aug. 26, 2013, the contents of which are hereby incorporated by reference.

The present invention relates to an earth alkali carbonate-containing filler material having a volatile onset temperature of ≥350° C., which is at least partially surface modified by using at least one polyhydrogensiloxane for increasing the hydrophobicity and/or decreasing the moisture pick up, a process for preparing such a surface modified earth alkali carbonate-containing filler material, a fibre and/or filament and/or film and/or thread and/or breathable film comprising the surface modified earth alkali carbonate-containing filler material as well as an article comprising the surface modified earth alkali carbonate-containing filler material and/or the fibre and/or filament and/or film and/or thread and/or breathable film, preferably its use in polyester products.

In practice, filler materials and especially calcium carbonate-containing filler materials are often used as particulate fillers in thermoplastic polymer products, like fibers, filaments, films and/or threads, usually made of polyethylene (PE), polypropylene (PP), polyurethane (PU), polyvinylchloride (PVC), polyester (PES) and/or polyimide (PA). However, additives are introduced to provide the filler material with a coating and to improve the dispersability of said filler material in the polymer composition as well as possibly to improve the proccessability of this polymer composition and/or properties of the final application products such as fibers, filaments, films, threads and/or breathable films. An elimination of such additives would unacceptably reduce the resulting fiber, filament, film, thread and/or breathable film quality. Furthermore, it is to be noted that such filler materials are generally associated with the presence of volatiles evolving at temperatures reached during the application of such mineral fillers and/or in the processing of said polymer products comprising such filler materials. Such volatiles may, for example, be:

- inherently associated with the filler material ("inherent volatiles"), and is especially associated water, and/or
- introduced during the treatment of the tiller material ("added volatiles"), for example, to render the filler material more dispersible within a polymeric plastic medium, and/or
- generated by the reaction, thermal decomposition of inherent organic materials and/or added organic materials and/or by the reaction with the filler material; such reactions may especially be induced or enhanced by temperatures reached during the introduction and/or processing of the polymeric material comprising the filler material, such as during extrusion or compounding processes; and/or
- generated by the degradation of inherent organic materials and/or added organic materials, forming $CO_2$, water and possibly low molecular mass fractions of these organic materials; such a degradation may especially be induced or enhanced by temperatures reached during the introduction and/or processing of the polymeric material comprising the filler material, such as during extrusion or compounding processes.

As a result of the presence of such volatiles, it may be difficult to prepare a fiber, filament, film, thread and/or breathable film free of voids leading to uneven surfaces and thus to a degradation of the quality of the final polymer product comprising such filler material. Moreover, volatiles may lead to a reduction in the tensile and tear strength of such a fiber, filament, film, thread and/or breathable film, and may degrade its visible aspects, in particular of its visible uniformity. Furthermore, volatiles can generate excessive foaming of the tiller material filled polymer melt during a step of compounding, causing unwanted product build-up at the vacuum extraction and hence, forcing a reduced output rate.

Such modified earth alkali carbonate-containing filler materials, like calcium carbonate-containing filler materials, are described in a number of documents. For instance, WO 00/20336 relates to an ultrafine natural calcium carbonate, which may optionally be treated with one or several fatty acids or one or several salts or mixtures thereof, and which is used as a rheology regulator for polymer compositions.

Likewise, U.S. Pat. No. 4,407,986 relates a precipitated calcium carbonate that is surface-treated with a dispersant that may include higher aliphatic acids and their metal salts in order to limit the addition of lubricant additives when kneading this calcium carbonate with crystalline polypropylene and to avoid the formation of calcium carbonate aggregates that limit the impact strength of the polypropylene.

EP 0 998 522 relates to surface treated calcium carbonate filler for breathable films using fatty acids of at least 10 carbon atoms wherein the filler before and after the treatment process has to be mostly free of moisture in the range of below 0.1 wt.-%.

In EP 0 325 114, relating to non-sagging underseal compositions for motor vehicles based on polyvinyl chloride which has improved rheological and adhesion properties, Example 7 discloses a mixture of an ammonium salt of 12-hydroxystearic acid in combination with a fatty acid (in a weight ratio of 1:1) used to treat a mineral filler.

WO 03/082966 relates to a cross-linkable and/or cross-linked nanofiller composition which, in optional embodiments, may additionally include fillers that may or may not be coated with stearic acid, stearate, silane, siloxane and/or titanate. Such nanofiller compositions are used to increase barrier properties, strength and heat distortion temperatures, making them useful in medical, automotive, electrical, construction and food application.

US 2002/0102404 describes dispersible calcium carbonate particles coated on their surface with a combination of saturated and unsaturated aliphatic carboxylic acids and salts thereof along with an organic compound such as a phthalic ester, which are used in adhesive compositions to improve viscosity stability and adhesion properties.

Moreover, US 2002/0102404 requires the implementation of a mixture of saturated and unsaturated aliphatic carboxylic acids/salts. The presence of unsaturated aliphatic carboxylic acids/salts increases the risk of unwanted in situ side reactions with the double bond during processing of any unsaturated aliphatic carboxylic acid/salt-comprising material. Additionally, the presence of unsaturated aliphatic carboxylic acids/salts may result in discoloration of, or unwanted odour development, and notably rancid odours, in the material in which they are implemented.

Claim 11 of WO 92/02587 indicates that a saponified sodium salt solution of at least one high molecular weight unsaturated fatty acid or combination of at least one high molecular weight unsaturated fatty acid and at least one high molecular weight unsaturated fatty acid, may be added to a pre-heated slurry of precipitated calcium carbonate, to ultimately produce a desired level of fatty acid coating on the calcium carbonate before proceeding with further process steps.

The abstract of JP54162746 discloses a composition comprising given relative amounts of rigid vinyl chloride resin, fatty acid treated-colloidal calcium carbonate, and barium stearate used in order to improve the heat stability of the vinyl chloride composition.

U.S. Pat. No. 4,520,073 describes mineral filler materials with improved hydrophobic coatings prepared by pressure coating of porous minerals using steam as a carrier for the coating material. Said coating material may be selected, among other options, from long chain aliphatic fatty acids and their salts.

WO 01/32787 describes a particulate alkaline earth metal carbonate material product which has on its particles a coating of hydrophobic material comprising a composition formed of (a) a first component which comprises the reaction product of the alkaline earth metal carbonate and at least one given aliphatic carboxylic acid and (b) a second component having a carbonate release temperature substantially higher than the first component comprises a compound of formula $CH_3(CH_2)_m COOR$.

WO 2008/077156 A2 relates to spunlaid fibers comprising at least one polymeric resin and at least one filler having an average particle size of less than or equal to about 5 microns and/or having a top cut of less than about 15 microns, wherein the at least one filler is present in an amount of less than about 40% by weight, relative to the total weight of the spunlaid fibers. The coating of the filler is described as being at least one organic material chosen from fatty acids and salts and esters thereof, e.g., stearic acid, stearate, ammonium stearate and calcium stearate.

GB 2 336 366 A relates to filled thermoplastic compositions, and, in particular, filled low density polyethylene compositions which are to be formed into products or articles by the process of extrusion. It is further described that the hydrophobising agent is preferably an organic carboxylic acid or partially or fully neutralised salt thereof which has at least one saturated or unsaturated hydrocarbon chain having from 8 to 28 carbon atoms, if the particulate mineral filler has a neutral to alkaline surface reaction, for example calcium carbonate.

The applicant also knows about the WO 2011/147778 describing a calcium carbonate-containing mineral filler product for film applications providing a volatile onset temperature of at least 250° C. comprising a treatment layer located on the surface of said mineral filler essentially consisting of saturated aliphatic carboxylic acids having from 6 to 9 carbon atoms and salts thereof.

The applicant also knows about the WO 2011/147802 describing a process to produce a surface treated mineral filler product for film application at a volatile onset temperature of at least 220° C., using one or more aliphatic aldehyde(s) having between 6 and 14 carbon atoms at a treatment level of a theoretical total weight of aldehyde of between 0.25 mg/m$^2$ and 5 mg/m$^2$ on the surface of the treated mineral filler product.

The applicant also knows about the WO 2008/125955 describing a process for the preparation of a treated mineral filler product by treating a dry mineral filler with at least one Group II or Group III salt of a C8 to C24 aliphatic monocarboxylic acid to produce an intermediate mineral filler product followed by treating the intermediate mineral filler product in a second step with at least one C8 to C24 aliphatic monocarboxylic acid to produce a treated mineral filler product and the volatiles, heating the product from 25° C. to 300° C. are below 0.25% by mass.

The applicant also knows about the WO 2010/023144 describing a surface treated mineral filler product comprising a treatment layer of at least one saturated C8 to C24 aliphatic carboxylic acid and at least one di and/or trivalent cation salt of one or more saturated C8 to C24 aliphatic carboxylic acid located on the surface of said mineral filler(s) in a weight ratio of all of said aliphatic carboxylic acid salt(s) all of said aliphatic carboxylic acid(s) from 51:49 to 75:25 and said treatment layer is present in an amount of at least 2.5 mg/m$^2$ and the total volatiles between 25° C. and 280° C. are of less than 0.25% by weight.

WO 2004/031302 A2 relates to a treating composition for application to particles of a filler consisting of 5-95% by weight of a silicon atom containing hydrophobic-type treating agent and 5-95% by weight of a silicon atom containing functional-type treating agent, based on the weight of the composition.

GB 2 355 453 A refers to a method for preparing hydrophobic calcium carbonate comprising surface treating the calcium carbonate with a surface treating agent which comprises a cyclic Si—H containing siloxane or an aqueous emulsion of an Si—H containing siloxane.

WO02/096992 (A2) refers to a silicone rubber composition comprising various fillers and polyorganosiloxane.

WO 2013/004621 A1 relates to a gypsum-containing construction material containing calcium carbonate and an organosilicon compound.

WO 02/055596 A1 relates to the treatment of mineral fillers with a view to making them hydrophobic and incorporating them in polymers, for example for manufacturing films, notably "breathable" films.

EP 0 811 035 A1 refers to a filler composition for thermoplastic olefins or thermoplastic elastomers. The composition comprises a halogen-free flame-retardant filler which is surface-treated with fatty acid derivatives and optionally a siloxane derivative.

WO 2007/078454 A2 refers to a film comprising: a) a polyolefin base resin; and b) a polyolefin carrier resin admixed with CaCO3; wherein the CaCO3 and the carrier resin are present in a ratio of 15/85 to 80/20 by weight.

DE 958 830 C refers to a process for the treatment of natural calcium carbonate. In particular, it is described that calcium carbonate is ground in the presence of surface active compounds such as synthetic or natural fatty acids, amino fatty acids, acid amides, fatty alcohols, waxes and resins.

U.S. Pat. No. 3,160,598 A relates to the manufacture of polyethylene compositions comprising fillers. It is described that cross-linking agents are fixed on the filler particles by means of a vehicle adapted to form a pellicle around each filler. The pellicle-forming fixing agent is an organic acid, preferably a saturated higher fatty acid.

However, the prior art does rarely disclose surface modified earth alkali carbonate-containing filler materials that are suitable for polymer compositions and which would solve the following multifaceted technical problem:

the filler material is sufficiently hydrophobic for use in the corresponding fiber, filament, film, thread and breathable film products and thus has a good dispersability of the filler material in the polymer composition from which the corresponding fiber, filament, film, thread and breathable film products is prepared;

the filler material features an increased volatile onset temperature, i.e., a volatile onset temperature of ≥350° C.;

the filler material features a limited total quantity of volatiles evolved between 25° C. and 380° C.;

the filler material has a low moisture pick up susceptibility such that the moisture adsorption is e.g., of ≤1.2 mg/g;

to identify a surface treatment agent that achieves the above regardless of whether or not the at least one surface modified earth alkali carbonate-containing filler material undergoes a salt exchange on contact with the surface treatment agent to create corresponding earth alkali salts on the surface of the surface modified earth alkali carbonate-containing filler material;

to provide a process for preparing such a filler material.

Thus, there is still a need for surface modified earth alkali carbonate-containing filler materials which address the foregoing technical problems described and especially allows for providing surface modified earth alkali carbonate-containing filler materials for improving the mechanical properties of final application products such as fibers, filaments, films, threads and/or breathable films comprising such surface modified earth alkali carbonate-containing filler material.

Accordingly, it is an objective of the present invention to provide a surface modified earth alkali carbonate-containing filler material having improved surface characteristics, and especially a high hydrophobicity. A further objective is to provide a surface modified earth alkali carbonate-containing filler material imparting improved mechanical properties to final application products such as fibers, filaments, films, threads and/or breathable films. A further objective is to provide a surface modified earth alkali carbonate-containing filler material having a high volatile onset temperature like ≥350° C. An even further objective is to provide a surface modified earth alkali carbonate-containing filler material featuring a limited quantity of total volatiles evolved at temperatures of between 25 and 380° C. A further objective is to provide a surface modified earth alkali carbonate-containing filler material featuring low moisture pick up susceptibility. Another objective of the present invention is to provide a surface modified earth alkali carbonate-containing filler material prepared by using a surface treatment agent which can be easily handled. A further objective is to provide a surface modified earth alkali carbonate-containing filler material prepared by a process that can be carried out under cost-efficient and mild conditions, i.e., by avoiding an intensive thermal treatment. Further objectives can be gathered from the following description of the invention.

The foregoing and other objectives are solved by the subject-matter as defined herein in claim 1.

Advantageous embodiments of the inventive surface modified calcium carbonate-containing filler material product are defined in the corresponding sub-claims.

According to one aspect of the present application, a surface modified earth alkali carbonate-containing filler material having a volatile onset temperature of ≥350° C. is provided, the surface modified earth alkali carbonate-containing filler material comprising:

a) at least one earth alkali carbonate-containing filler material, and b) a treatment layer located on at least a part of the surface of the at least one earth alkali carbonate-containing filler material, wherein i) the treatment layer comprises at least one polyhydrogensiloxane and reaction products thereof, and ii) the surface modified earth alkali carbonate-containing filler material comprises the treatment layer in a total amount of from 0.7 to 6.0 mg/m², based on the surface modified calcium carbonate-containing filler material.

The inventors surprisingly found out that the foregoing surface modified earth alkali carbonate-containing filler material has a high hydrophobicity and thus imparts excellent mechanical properties to final application products such as fibers and/or filaments and/or films and/or threads and/or breathable films. In particular, it has been found out that the surface modified earth alkali carbonate-containing filler material according to the present invention provides a high hydrophobicity and very low moisture pick up susceptibility as well as a high volatile onset temperature of at least 350° C., a limited quantity of total volatiles evolved at temperatures of between 25 and 380° C. Furthermore, the surface modified earth alkali carbonate-containing filler material can be prepared without intensive thermal treatments and thus under cost-efficient and mild conditions. In addition thereto, the skilled person does not expect that earth alkali carbonates, like calcium carbonates, form stable bonds with silane coupling agents (cf. Gelest, Inc. Morrisville, Pa. 19067; Product catalogue: Silane Coupling Agents-Connecting Across Boundaries; Version 2006).

It should be understood that for the purposes of the present invention, the following terms have the following meanings:

For the purpose of the present invention, the term "filler material" in the meaning of the present invention refers to substances added to materials such as paper, plastics, rubber, paints and adhesives, etc. to lower the consumption of more expensive materials such as binders, or to enhance technical properties of the products. The person skilled in the art very well knows the typical filler materials used in the respective fields. Preferably, the filler material is of mineral origin.

The term "earth alkali" carbonate-containing filler material in the meaning of the present invention comprises the group 2 elements, i.e., beryllium (Be), magnesium (Mg), calcium (Ca), strontium (Sr), barium (Ba) and radium (Ra). It is further appreciated that the earth alkali carbonate-containing filler material comprises the "earth alkali" metal in the form of cations having an oxidation state of +2.

The term "earth alkali carbonate-containing filler material" refers to a material that comprises at least 80.0 wt.-% earth alkali carbonate, preferably from 85.0 to 99.99 wt.-% earth alkali carbonate, based on the total dry weight of the earth alkali carbonate-containing filler material. For example, the "earth alkali carbonate-containing filler material" refers to a calcium carbonate-containing filler material comprising at least 80.0 wt.-%, preferably from 85.0 to 99.99 wt.-%, calcium carbonate, based on the total dry weight of the calcium carbonate-containing filler material. For the purpose of the present invention, the term "calcium carbonate-containing filler material" also refers to a material that comprises at least 50.0 molar-% calcium carbonate based on total Mols, if the calcium carbonate-containing filler material is dolomite.

The term "surface modified" earth alkali carbonate-containing filler material in the meaning of the present invention refers to a earth alkali carbonate-containing filler material which has been contacted with a surface treatment agent such as to obtain a treatment layer located on at least a part of the surface of the earth alkali carbonate-containing filler material. Accordingly, the term "treatment layer" refers to a layer comprising the surface treatment agent and reaction products thereof on at least a part of the surface of the earth alkali carbonate-containing filler material.

The term "volatile onset temperature" in the meaning of the present application refers to a temperature at which volatiles—including volatiles introduced as a result of common filler material preparation steps including grinding, with or without grinding aid agents, benefaction, with or without flotation aid or other agents, and other pre-treatment agents not expressly listed above, detected according to the thermogravimetric analysis described hereafter—begin to evolve, as observed on a thermogravimetric (TGA) curve, plotting the mass of remaining sample (y-axis) as a function of temperature x-axis), the preparation and interpretation of such a curve being defined hereafter.

The term "polyhydrogensiloxane" in the meaning of the present invention refers to a compound comprising a polysiloxane backbone being substituted with alkyl substituents, hydrogen and optional further substituents.

The term "reaction products" in the meaning of the present invention refers to products obtained by contacting the at least one calcium carbonate-containing filler material with at least one polyhydrogensiloxane.

The applicant assumes that at least a part of said reaction products are formed from the applied at least one polyhydrogensiloxane. Additionally, it is also assumed that reactive molecules located at the surface of the at least one earth alkali carbonate containing filler material may have an influence on the formation of said reaction products.

The term "moisture pick up susceptibility" in the meaning of the present invention refers to the amount of moisture absorbed on the surface of the filler material and is determined in mg moisture/g of the dry surface modified earth alkali carbonate-containing filler material a temperature of +23° C. (±2° C.).

The "hydrophobicity" of a filler product is evaluated at +23° C. (±2° C.) by determining the minimum water to ethanol ratio in a volume/volume based water/ethanol-mixture needed for the settling of the majority of said surface modified earth alkali carbonate-containing filler material, where said filler material is deposited on the surface of said water ethanol-mixture by passage through a house hold tea sieve. The volume/volume base is related to the volumes of both separate liquids before blending them together and do not include the volume contraction of the blend.

The term "specific surface area" (in $m^2/g$) of the filler material in the meaning of the present invention is determined using the BET method with nitrogen as adsorbing gas, which is well known to the skilled man (ISO 9277: 1995). The total surface area (in $m^2$) of the filler material is then obtained by multiplication of the specific surface area and the mass (in g) of the filler material prior to treatment.

The term "dry" earth alkali carbonate-containing filler material is understood to be a filler material having less than 0.3% by weight of water relative to the filler material weight. The % water (equal to residual total moisture content) is determined according to the Coulometric Karl Fischer measurement method, wherein the filler material is heated to 220° C., and the water content released as vapour and isolated using a stream of nitrogen gas (at 100 ml/min) is determined in a Coulometric Karl Fischer unit.

As used herein and as generally defined in the art, the "$d_{50}$" value is determined based on measurements made by using a Sedigraph™ 5100 of Micromeritics Instrument Corporation (operating instrument software version 1.04) and is defined as the size at which 50% (the median point) of the particle volume or mass is accounted for by particles having a diameter equal to the specified value. The method and the instrument are known to the skilled person and are commonly used to determine particle size distribution of fillers and pigments. The measurement is carried out in an aqueous solution of 0.1 wt.-% $Na_4P_2O_7$. The samples are dispersed using a high speed stirrer and supersonics.

Where the term "comprising" is used in the present description and claims, it does not exclude other non-specified elements of major or minor functional importance. For the purposes of the present invention, the term "consisting of" is considered to be a preferred embodiment of the term "comprising of". If hereinafter a group is defined to comprise at least a certain number of embodiments, this is also to be understood to disclose a group, which preferably consists only of these embodiments.

Whenever the terms "including" or "having" are used, these terms are meant to be equivalent to "comprising" as defined above.

Where an indefinite or definite article is used when referring to a singular noun, e.g., "a", "an" or "the", this includes a plural of that noun unless something else is specifically stated.

According to another aspect of the present invention, a process for preparing the surface modified earth alkali carbonate-containing filler material is provided, the process comprises at least the steps of:

a) providing at least one earth alkali carbonate-containing filler material;

b) providing at least one polyhydrogensiloxane;

c) contacting the at least one earth alkali carbonate-containing filler material of step a), in one or more steps at a temperature of from 40 to 200° C., with the at least one polyhydrogensiloxane of step b) such that the total amount of the at least one polyhydrogensiloxane added is from 0.7 to 6.0 mg/m², based on the at least one earth alkali carbonate-containing filler material of step a), d) contacting the at least one earth alkali carbonate-containing filler material of step a) before and/or during and/or after contacting step c), in one or more steps, with water; and e) foaming a treatment layer comprising the at least one polyhydrogensiloxane of step b) and reaction products thereof on at least a part of the surface of the at least one earth alkali carbonate-containing filler material of step a) such as to obtain a surface modified earth alkali carbonate-containing filler material having a volatile onset temperature of ≥350° C.

It is preferred that contacting step d) is carried out during contacting step c). It is further preferred that the at least one polyhydrogensiloxane of step b) is provided as undiluted compound or in form of an aqueous emulsion, preferably an aqueous emulsion comprising the at least one polyhydrogensiloxane in an amount of from 20.0 to 99.0 wt.-%, preferably from 40.0 to 98.0 wt.-% and most preferably from 50.0 to 95.0 wt.-%, based on the total weight of the aqueous emulsion. It is also preferred that the at least one calcium carbonate-containing filler material of step a) is preheated before contacting step c) is carried out, preferably the at least one calcium carbonate-containing filler material of step a) is preheated at a temperature of from 40 to 200° C., more preferably of from 50 to 180° C., even more preferably of from 60 to 150° C. and most preferably of from 60 to 120° C. It is even further preferred that contacting step c) is carried out at a temperature of from 50 to 180° C., more preferably of from 60 to 150° C. and most preferably of from 60 to 120° C.

According to a further aspect of the present invention, a fibre and/or filament and/or film and/or thread and/or breathable film comprising the surface modified earth alkali carbonate-containing filler material is provided.

According to a still further aspect of the present invention, an article comprising the surface modified earth alkali carbonate-containing filler material and/or the fibre and/or filament and/or film and/or thread and/or breathable film is provided, wherein the article is selected from the group comprising hygiene products, medical and healthcare products, filter products, geotextile products, agriculture and horticulture products, clothing, footwear and baggage products, household and industrial products, packaging products, like PET beverage containers, construction products and the like. According to a still further aspect of the present invention, the use of a surface modified earth alkali carbonate-containing filler material having a volatile onset temperature of 350° C. in polyester products is provided, such as products of polyethylene terephthalate (PET), recycled polyethylene terephthalate (PET), polybutylene terephthalate (PBT) and/or polycarbonate (PC). According to another aspect of the present invention, the use of at least one polyhydrogensiloxane for increasing the hydrophobicity and/or decreasing the moisture pick up susceptibility of a surface modified earth alkali carbonate-containing filler material is provided.

According to one embodiment of the present invention, the at least one earth alkali carbonate-containing filler material is selected from precipitated calcium carbonate (PCC), like one or more of the aragonitic, vateritic and calcitic mineralogical crystal forms, and/or natural ground calcium carbonate (NGCC), like one or more of marble, limestone, or chalk, and; or dolomite.

According to another embodiment of the present invention, the at least one earth alkali carbonate-containing filler material has a) a weight median particle size diameter $d_{50}$ in the range from 0.3 μm to 10.0 μm, preferably from 0.5 μm to 5.0 μm, more preferably from 1.0 μm to 3.0 μm and most preferably from 1.5 μm to 1.8 μm, and/or b) a specific surface area (BET) in the range from 1.0 m²/g to 10.0 m²/g and more preferably in the range from 3.0 m²/g to 8.0 m²/g as measured by the BET nitrogen method.

According to one embodiment of the present invention, the at least one polyhydrogensiloxane is at least one compound of the following Formula I

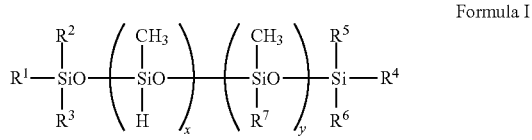

Formula I wherein x>y, and x+y are in the range from 5 to 200; $R^1$, $R^2$, $R^3$, $R^4$, $R^5$ and $R^6$ are independently from each other hydrogen or a saturated linear or branched alkyl group having 1 to 6 carbon atoms and $R^7$ is hydrogen or a methyl group.

According to yet another embodiment of the present invention, the surface modified earth alkali carbonate-containing filler material features a volatile onset temperature of ≥400° C., preferably of ≥450° C., and most preferably of ≥500° C.

According to one embodiment of the present invention, the surface modified earth alkali carbonate-containing filler material features a higher volatile onset temperature than the same filler material comprising a treatment layer consisting only of at least one saturated aliphatic linear or branched carboxylic acid and salty reaction products thereof and/or at least one mono-substituted succinic anhydride and salty reaction products thereof and/or at least one alkyl phosphoric acid ester and salty reaction products.

According to another embodiment of the present invention, the surface modified earth alkali carbonate-containing filler material has a moisture pick up susceptibility of from 1.2 to 0.1 mg/g, preferably from 1.1 to 0.2 mg/g, and more preferably from 1.0 to 0.3 mg/g.

According to yet another embodiment of the present invention, the surface modified earth alkali carbonate-containing filler material has been obtained by a process as described herein.

As set out above, the inventive surface modified earth alkali carbonate-containing filler material having a volatile onset temperature of ≥350° C. comprises at least one earth alkali carbonate-containing filler material and a treatment layer located on at least a part of the surface of the at least one earth alkali carbonate-containing filler material as set out in points a) and b). In the following, it is referred to further details of the present invention and especially the foregoing points of the inventive surface modified earth alkali carbonate-containing filler material.

According to point (a) of the present invention, the surface modified earth alkali carbonate-containing filler material having a volatile onset temperature of ≥350° C. comprises at least one earth alkali carbonate-containing filler material.

The at least one earth alkali carbonate-containing filler material of the present invention preferably refers to a filler material selected from among magnesium carbonate-containing filler material, calcium carbonate-containing filler material and mixtures thereof. In one embodiment of the present invention, the at least one earth alkali carbonate-containing filler material is at least one calcium carbonate-containing filler material.

For example, the at least one earth alkali carbonate-containing filler material in the meaning of the present invention preferably refers to a calcium carbonate-containing filler material selected from among natural ground calcium carbonate (NGCC) and/or a precipitated calcium carbonate (PCC).

NGCC is understood to be a naturally occurring form of calcium carbonate, mined from sedimentary rocks such as limestone or chalk, or from metamorphic marble rocks and processed through a treatment such as grinding, screening and/or fractionizing in wet and/or dry form, for example by a cyclone or classifier. In one embodiment of the present invention, the NGCC is selected from the group comprising marble, chalk, dolomite, limestone and mixtures thereof.

By contrast, calcium carbonate of the PCC type include synthetic calcium carbonate products obtained by carbonation of a slurry of calcium hydroxide, commonly referred to in the art as a slurry of lime or milk of lime when derived from finely divided calcium oxide particles in water or by precipitation out of an ionic salt solution. PCC may be rhombohedral and/or scalenohedral and/or aragonitic; preferred synthetic calcium carbonate or precipitated calcium carbonate comprising aragonitic, vateritic or calcitic mineralogical crystal forms or mixtures thereof.

The expression "at least one" earth alkali carbonate-containing filler material means that one or more kinds of earth alkali carbonate-containing filler material may be present in the inventive surface modified earth alkali carbonate-containing filler material.

Accordingly, it is appreciated that the at least one earth alkali carbonate-containing filler material may be a mixture of two or more kinds of an earth alkali carbonate-containing filler material. For example, if the at least one earth alkali carbonate-containing filler material is a mixture of two or more earth alkali carbonate-containing filler materials, one filler material can be a magnesium carbonate-containing filler material, while the second or further filler material can be a calcium carbonate-containing filler material. Additionally or alternatively, if the at least one earth alkali carbonate-containing filler material is at least one calcium carbonate-containing filler material, the at least one calcium carbonate-containing filler material can be a mixture of two or more calcium carbonate-containing filler materials, i.e., one calcium carbonate-containing filler material can be marble, while the second or further calcium carbonate-containing filler material can be selected from the group comprising chalk, dolomite, limestone, PCC of aragonitic, vateritic or calcitic mineralogical crystal forms and mixtures thereof.

In one embodiment of the present invention, the at least one earth alkali carbonate-containing filler material is one kind of an earth alkali carbonate-containing filler material. Preferably, the at least one earth alkali carbonate-containing filler material is at least one calcium carbonate-containing filler material being selected from marble, dolomitic marble and mixtures thereof.

If the at least one earth alkali carbonate-containing filler material is at least one calcium carbonate-containing filler material, it is appreciated that the amount of calcium carbonate in the at least one calcium carbonate-containing filler material is at least 80.0 wt.-%, e.g., at least 95.0 wt.-%, preferably between 97.0 and 100.0 wt.-%, more preferably between 98.5 and 99.95 wt.-%, based on the total dry weight of the at least one calcium carbonate-containing filler material.

The at least one earth alkali carbonate-containing filler material is preferably in the form of a particulate material, and may have a particle size distribution as conventionally employed for the material(s) involved in the type of product to be produced. In general, it is preferred that the at least one earth alkali carbonate-containing filler material has a weight median particle size diameter $d_{50}$ in the range from 0.3 μm to 10.0 μm. For example, the at least one earth alkali carbonate-containing filler material has a weight median particle size diameter $d_{50}$ in the range from 0.5 μm to 5.0 μm, more preferably from 1.0 μm to 3.0 μm and most preferably from 1.5 μm to 1.8 μm.

Furthermore, the at least one earth alkali carbonate-containing filler material can have a top cut ($d_{50}$) of ≤15.0 μm. For example, the at least one earth alkali carbonate-containing filler material has a top cut ($d_{50}$) of ≤12.5 μm, preferably of ≤10.0 μm and most preferably of ≤7.5 μm.

Additionally or alternatively, the at least one earth alkali carbonate-containing filler material has a BET specific surface area (BET) in the range from 1.0 $m^2/g$ to 10.0 $m^2/g$ as measured by the BET nitrogen method according to ISO 9277. For example, the at least one earth alkali carbonate-containing filler material has a BET specific surface area (BET) in the range from 3.0 $m^2/g$ to 8.0 $m^2/g$ as measured by the BET nitrogen method according to ISO 9277.

In one embodiment of the present invention, the at least one earth alkali carbonate-containing filler material has a weight median particle size diameter $d_{50}$ value from 0.3 μm to 10.0 μm, preferably from 0.5 μm to 5.0 μm and most preferably from 1.0 μm to 3.0 μm or from 1.5 μm to 1.8 μm and a specific surface area (BET) in the range from 1.0 $m^2/g$ to 10.0 $m^2/g$ and more preferably in the range from 3.0 $m^2/g$ to 8.0 $m^2/g$ as measured by the BET nitrogen method, measured using nitrogen and the BET method according to ISO 9277.

For example, the at least one earth alkali carbonate-containing filler material is at least one calcium carbonate-containing filler material selected from a marble, having a weight median particle size diameter $d_{50}$ value from 0.3 μm to 10.0 μm, preferably from 0.5 μm to 5.0 μm and most preferably from 1.0 μm to 3.0 μm or from 1.5 μm to 1.8 μm. In this case, the at least one calcium carbonate-containing filler material exhibits a specific surface area (BET) in the range from 1.0 $m^2/g$ to 10.0 $m^2/g$ and more preferably in the range from 3.0 $m^2/g$ to 8.0 $m^2/g$ as measured by the BET nitrogen method, measured using nitrogen and the BET method according to ISO 9277.

It is preferred that the at least one earth alkali carbonate-containing filler material, such as a calcium carbonate-containing filler material, is a dry ground material, a material being wet ground and dried or a mixture of the foregoing materials. In general, the grinding step can be carried out with any conventional grinding device, for example, under conditions such that refinement predominantly results from impacts with a secondary body, i.e., in one or more of: a ball mill, a rod mill, a vibrating mill, a roll crusher, a centrifugal impact mill, a vertical bead mill an attrition mill, a pin mill, a hammer mill, a pulveriser, a shredder, a de-clumper, a knife cutter, or other such equipment known to the skilled man.

In case the at least one earth alkali carbonate-containing filler material, such as a calcium carbonate-containing filler material, is a wet ground earth alkali carbonate-containing filler material, the grinding step may be performed under conditions such that autogenous grinding takes place and/or by horizontal ball milling, and/or other such processes known to the skilled man. The wet processed ground earth alkali carbonate-containing filler material, such as a calcium carbonate-containing filler material, thus obtained may be washed and dewatered by well known processes, e.g., by flocculation, filtration or forced evaporation prior to drying. The subsequent step of drying may be carried out in a single step such as spray drying, or in at least two steps, e.g., by applying a first heating step to the earth alkali carbonate-containing filler material, such as a calcium carbonate-containing filler material, in order to reduce the associated moisture content to a level which is not greater than about 0.5 wt.-%, based on the total dry weight of the at least one earth alkali carbonate-containing filler material, such as a calcium carbonate-containing filler material. The residual total moisture content of the filler can be measured by the Karl Fischer coulometric titration method, desorbing the moisture in an oven at 195° C. and passing it continuously into the KF coulometer (Mettler Toledo coulometric KF Titrator C30, combined with Mettler oven DO 0337) using dry $N_2$ at 100 ml/min for 10 min. The residual total moisture content can be determined with a calibration curve and also a blind of 10 min gas flow without a sample can be taken into account. The residual total moisture content may be further reduced by applying a second heating step to the at least one earth alkali carbonate-containing filler material, such as a calcium carbonate-containing filler material. In case said drying is carried out by more than one drying steps, the first step may be carried out by heating in a hot current of air, while the second and further drying steps are preferably carried out by an indirect heating in which the atmosphere in the corresponding vessel comprises a surface treatment agent. It is also common that the at least one earth alkali carbonate-containing filler material, such as a calcium carbonate-containing filler material, is subjected to a beneficiation step (such as a flotation, bleaching or magnetic separation step) to remove impurities.

In one embodiment of the present invention, the at least one earth alkali carbonate-containing filler material is a calcium carbonate-containing filler material comprising a dry ground calcium carbonate-containing filler material. In another embodiment, the at least one earth alkali carbonate-containing filler material is a calcium carbonate-containing filler material being a material which is wet ground in a horizontal ball mill, and subsequently dried by using the well known process of spray drying.

Depending on the at least one earth alkali carbonate-containing filler material, the at least one earth alkali carbonate-containing filler material has a residual total moisture content of from 0.01 to 1.0 wt.-%, preferably from 0.01 to 0.2 wt.-%, more preferably from 0.02 to 0.15 wt.-% and most preferably from 0.04 to 0.15 wt.-%, based on the total thy weight of the at least one earth alkali carbonate-containing filler material.

For example, in case a wet ground and spray dried marble is used as the at least one earth alkali carbonate-containing filler material being a calcium carbonate-containing filler material, the residual total moisture content of the at least one earth alkali carbonate-containing filler material is preferably of from 0.01 to 0.1 wt.-%, more preferably from 0.02 to 0.08 wt.-% and most preferably from 0.04 to 0.07 wt.-%, based on the total dry weight of the at least one earth alkali carbonate-containing filler material. If a PCC is used as the at least one earth alkali carbonate-containing filler material being a calcium carbonate-containing filler material, the residual total moisture content of the at least one earth alkali carbonate-containing filler material is preferably of from 0.01 to 0.2 wt.-%, more preferably from 0.05 to 0.17 wt.-% and most preferably from 0.05 to 0.10 wt.-%, based on the total dry weight of the at least one earth alkali carbonate-containing filler material.

In accordance with the present invention, the surface modified earth alkali carbonate-containing filler material comprises a treatment layer located on at least a part of the surface of the at least one earth alkali carbonate-containing filler material. It is one specific requirement of the present invention that the treatment layer located on at least a part of the surface of the at least one earth alkali carbonate-containing filler material comprises at least one polyhydrogensiloxane and reaction products thereof.

Thus, it is appreciated that the surface modified earth alkali carbonate-containing filler material comprises, preferably consists of, surface modified earth alkali carbonate-containing filler material and at least one polyhydrogensiloxane and reaction products thereof.

In one embodiment of the present invention, the surface modified earth alkali carbonate-containing filler material comprises the earth alkali carbonate-containing filler material in an amount of ≥90.0 wt.-%, based on the total dry weight of the surface modified earth alkali carbonate-containing filler material. For example, the surface modified earth alkali carbonate-containing filler material comprises the at least one earth alkali carbonate-containing filler material in an amount of ≥92.5 wt.-% and preferably of ≥95.0 wt.-%, based on the total dry weight of the surface modified earth alkali carbonate-containing filler material.

It is one further requirement of the present invention that the surface modified earth alkali carbonate-containing filler material comprises the treatment layer comprising, preferably consisting of, at least one polyhydrogensiloxane and reaction products thereof, in a total amount of from 0.7 to 6.0 mg/m$^2$, based on the surface modified earth alkali carbonate-containing filler material. For example, the surface modified earth alkali carbonate-containing filler material comprises the treatment layer comprising, preferably consisting of, at least one polyhydrogensiloxane and reaction products thereof, in a total amount of from 0.7 to 5.0 mg/m$^2$ or from 1.0 to 4.0 mg/m$^2$, based on the surface modified earth alkali carbonate-containing filler material.

In one embodiment of the present invention, the surface modified earth alkali carbonate-containing filler material comprises the treatment layer comprising, preferably consisting of, at least one polyhydrogensiloxane and reaction products thereof, in an amount of from 0.1 to 6.0 wt.-%, based on the total dry weight of the surface modified earth alkali carbonate-containing filler material. For example, the surface modified earth alkali carbonate-containing filler material comprises the treatment layer comprising, preferably consisting of, at least one polyhydrogensiloxane and reaction products thereof, in an amount of from 0.2 to 5.0 wt.-% and preferably of from 0.3 to 4.5 wt.-%, based on the total dry weight of the surface modified earth alkalicarbonate-containing filler material.

Accordingly, it is appreciated that the surface modified earth alkali carbonate-containing filler material comprises the at least one earth alkalicarbonate-containing filler material in an amount of ≥90.0 wt.-% and the treatment layer comprising, preferably consisting of, at least one polyhydrogensiloxane and reaction products thereof, in an amount of from 0.1 to 6.0 wt.-%, based on the total dry weight of the surface modified earth alkalicarbonate-containing filler material. Alternatively, the surface modified earth alkali carbonate-containing filler material comprises the earth alkali carbonate-containing filler material in an amount of ≥92.5 wt.-% and the treatment layer comprising, preferably consisting of, at least one polyhydrogensiloxane and reaction products thereof, in an amount of from 0.2 to 5.0 wt.-%, based on the total dry weight of the surface modified earth alkali carbonate-containing filler material. Alternatively, the surface modified earth alkali carbonate-containing filler material comprises the at least one earth alkali carbonate-containing filler material in an amount of ≥95.0 wt.-% and the treatment layer comprising, preferably consisting of, at least one polyhydrogensiloxane and reaction products thereof, in an amount of from 0.3 to 4.5 wt.-%, based on the total dry weight of the surface modified earth alkali carbonate-containing filler material.

At least a part of the surface of the at least one earth alkali carbonate-containing filler material of the surface modified earth alkali carbonate-containing filler material comprises a treatment layer comprising at least one polyhydrogensiloxane and reaction products thereof.

It is appreciated that the expression "at least one" polyhydrogensiloxane means that one or more kinds of polyhydrogensiloxane may be present in the treatment layer.

Accordingly, it should be noted that the at least one polyhydrogensiloxane can be one kind of polyhydrogensiloxane. Alternatively, the at least one polyhydrogensiloxane can be a mixture of two or more kinds of polyhydrogensiloxane. For example, the at least one polyhydrogensiloxane is a mixture of two or three kinds of polyhydrogensiloxane, like two kinds of at least one polyhydrogensiloxane.

In one embodiment of the present invention, the at least one polyhydrogensiloxane is one kind of polyhydrogensiloxane.

It is appreciated that the at least one polyhydrogensiloxane is preferably at least one compound of the following Formula I

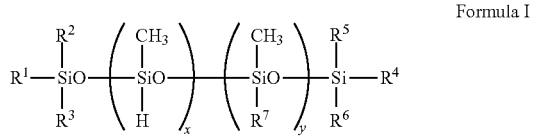

Formula I wherein x>y, and x+y is in the range from 5 to 200; $R^1$, $R^2$, $R^3$, $R^4$, $R^5$ and $R^6$ are independently from each other hydrogen or a saturated linear or branched alkyl group having 1 to 6 carbon atoms and $R^7$ is hydrogen or a methyl group.

For example, the at least one polyhydrogensiloxane is at least one compound of Formula I, wherein x+y is in the range from 10 to 100.

It is appreciated that x and y are positive integers, wherein x is in the range from 1 to 200 and y is in the range from 0 to 200.

In one embodiment of the present invention, y≥0. For example, y is 0. It is thus appreciated that x is preferably >0, more preferably >3 and most preferably >5. For example, x is from 5 to 200 or from 10 to 100.

In one embodiment of the present invention, $R^1$, $R^2$, $R^3$, $R^4$, $R^5$ and $R^6$ are independently from each other a saturated linear or branched alkyl group having 1 to 6 carbon atoms. For example, $R^1$, $R^2$, $R^3$, $R^4$, $R^5$ and $R^6$ are independently from each other a saturated linear alkyl group having 1 to 6 carbon atoms. In one embodiment of the present invention, $R^1$, $R^2$, $R^3$, $R^4$, $R^5$ and $R^6$ are independently from each other methyl or ethyl groups, like methyl groups. Additionally or alternatively, $R^7$ is a methyl group.

In one embodiment of the present invention, the at least one polyhydrogensiloxane is at least one compound of Formula I, wherein x>y; x+y is in the range from 5 to 200, like 10 to 100, and $R^1$, $R^2$, $R^3$, $R^4$, $R^5$, $R^6$ and $R^7$ are methyl groups.

In another embodiment of the present invention, the at least one polyhydrogensiloxane is at least one compound of Formula I, wherein x>y; x+y is in the range from 5 to 200, like 10 to 100, $R^1$, $R^2$, $R^3$, $R^4$, $R^5$ and $R^6$ are methyl groups and $R^7$ is hydrogen.

For example, the at least one polyhydrogensiloxane is at least one compound of Formula I, wherein x>y; y is 0 and x+y is in the range from 5 to 200, like 10 to 100, and $R^1$, $R^2$, $R^3$, $R^4$, $R^5$ and $R^6$ are methyl groups. Accordingly, the at least one polyhydrogensiloxane is preferably at least one compound of Formula I, wherein y is 0 and x is in the range from 5 to 200, like 10 to 100, and $R^1$, $R^2$, $R^3$, $R^4$, $R^5$, $R^6$ are methyl groups.

It is also appreciated that the at least one polyhydrogensiloxane can have a number average molecular weight ($M_n$) of from 1 000 to 10 000 g/mol. In one embodiment of the present invention, the at least one polyhydrogensiloxane has a number average molecular weight ($M_n$) of from 1 500 to 5 000 g/mol and preferably from 1 500 to 3 500 g/mol. For example, the at least one polyhydrogensiloxane has a number average molecular weight ($M_n$) of from 1 700 to 3 200 g/mol.

It is appreciated that the treatment layer of the surface modified earth alkali carbonate-containing filler material comprises reaction products obtained by contacting the at least one calcium carbonate-containing filler material with the at least one polyhydrogensiloxane. In such a case, the treatment layer of the surface modified earth alkali carbonate-containing filler material preferably comprises reaction products such as one or more crosslinked reaction product and/or one or more hydroxylated reaction product of the at least one polyhydrogensiloxane.

In one embodiment of the present invention, the treatment layer of the surface modified earth alkali carbonate-containing filler material can further comprise a) at least one saturated aliphatic linear or branched carboxylic acid and salty reaction products thereof, and/or b) at least one mono-substituted succinic anhydride and salty reaction products thereof, and/or c) at least one alkyl phosphoric acid ester and salty reaction products thereof. For example, the treatment layer of the surface modified earth alkali carbonate-containing filler material further comprises a) at least one saturated aliphatic linear or branched carboxylic acid and salty reaction products thereof, or b) at least one mono-substituted succinic anhydride and salty reaction products thereof, or c) at least one alkyl phosphoric acid ester and salty reaction products thereof.

The term "salty reaction products" in the meaning of the present invention refers to products obtained by contacting the at least one earth alkali carbonate-containing filler material with at least one saturated aliphatic linear or branched carboxylic acid and/or at least one mono-substituted succinic anhydride and/or at least one alkyl phosphoric acid ester. Said reaction products are formed between the applied at least one saturated aliphatic linear or branched carboxylic acid and/or at least one mono-substituted succinic anhydride and/or at least one alkyl phosphoric acid ester and reactive molecules located at the surface of the at least one earth alkali carbonate-containing filler material.

In one embodiment of the present invention, the treatment layer of the surface modified earth alkali carbonate-containing filler material further comprises a) at least one saturated aliphatic linear or branched carboxylic acid and salty reaction products thereof.

It is appreciated that the expression "at least one" saturated aliphatic linear or branched carboxylic acid means that one or more kinds of saturated aliphatic linear or branched carboxylic acid and corresponding salty reaction products thereof can be present in the treatment layer of the inventive surface modified earth alkali carbonate-containing filler material.

Accordingly, it should be noted that the at least one saturated aliphatic linear or branched carboxylic acid can be one kind of a saturated aliphatic linear or branched carboxylic acid. Alternatively, the at least one saturated aliphatic linear or branched carboxylic acid can be a mixture of two or more kinds of saturated aliphatic linear or branched carboxylic acids. For example, the at least one saturated aliphatic linear or branched carboxylic acid may be a mixture of two or three kinds of saturated aliphatic linear or branched carboxylic acids, like two kinds of saturated aliphatic linear or branched carboxylic acids.

In one embodiment of the present invention, the at least one saturated aliphatic linear or branched carboxylic acid is one kind of a saturated aliphatic linear or branched carboxylic acid.

The at least one saturated aliphatic linear or branched carboxylic acid is preferably at least one saturated aliphatic linear carboxylic acid, more preferably at least one saturated aliphatic linear carboxylic acid having from 5 to 24 carbon atoms. Preferably, the at least one saturated aliphatic linear carboxylic acid is a monocarboxylic acid, i.e., the at least one saturated aliphatic linear carboxylic acid is characterized in that a single carboxyl group is present. Said carboxyl group is placed at the end of the carbon skeleton.

In one embodiment of the present invention, the at least one saturated aliphatic linear carboxylic acid is selected from the group of carboxylic acids consisting of pentanoic acid, hexanoic acid, heptanoic acid, octanoic acid, nonanoic acid, decanoic acid, undecanoic acid, lauric acid, tridecanoic acid, myristic acid, pentadecanoic acid, palmitic acid, heptadecanoic acid, stearic acid, nonadecanoic acid, arachidic acid, heneicosylic acid, behenic acid, tricosylic acid, lignoceric acid and mixtures thereof.

In another embodiment of the present invention, the at least one saturated aliphatic linear carboxylic acid is selected from the group consisting of octanoic acid, decanoic acid, lauric acid, myristic acid, palmitic acid, stearic acid, arachidic acid and mixtures thereof. Preferably, the at least one saturated aliphatic linear carboxylic acid is selected from the group consisting of myristic acid, palmitic acid, stearic acid and mixtures thereof.

For example, the at least one saturated aliphatic linear carboxylic acid is stearic acid.

If the treatment layer of the surface modified earth alkali carbonate-containing filler material comprises at least one saturated aliphatic linear or branched carboxylic acid, the treatment layer further comprises salty reaction products obtained from contacting the at least one earth alkali carbonate-containing filler material with the at least one saturated aliphatic linear or branched carboxylic acid. In such a case, the treatment layer of the surface modified earth alkali carbonate-containing filler material preferably comprises salty reaction products such as one or more calcium and/or magnesium salts of the at least one saturated aliphatic linear or branched carboxylic acid.

Additionally or alternatively, the treatment layer of the surface modified earth alkali carbonate-containing filler material further comprises a) at least one mono-substituted succinic anhydride and salty reaction products thereof.

It is appreciated that the expression "at least one" mono-substituted succinic anhydride means that one or more kinds of mono-substituted succinic anhydride and the corresponding salty reaction products thereof can be present in the treatment layer of the inventive surface modified earth alkali carbonate-containing filler material.

Accordingly, it should be noted that the at least one mono-substituted succinic anhydride can be one kind of a mono-substituted succinic anhydride. Alternatively, the at least one mono-substituted succinic anhydride can be a mixture of two or more kinds of mono-substituted succinic anhydrides. For example, the at least one mono-substituted succinic anhydride may be a mixture of two or three kinds of mono-substituted succinic anhydride, like two kinds of mono-substituted succinic anhydrides.

In one embodiment of the present invention, the at least one mono-substituted succinic anhydride is one kind of a mono-substituted succinic anhydride.

It is appreciated that the at least one mono-substituted succinic anhydride consists of succinic anhydride mono-substituted with a group selected from any linear, branched, aliphatic and cyclic group having a total amount of carbon atoms from C2 to C30 in the substituent.

In one embodiment of the present invention, the at least one mono-substituted succinic anhydride consists of succinic anhydride mono-substituted with a group selected from a linear, branched, aliphatic and cyclic group having a total amount of carbon atoms from C3 to C20 in the substituent. For example, the at least one mono-substituted succinic anhydride consists of succinic anhydride mono-substituted with a group selected from a linear, branched, aliphatic and cyclic group having a total amount of carbon atoms from C4 to C18 in the substituent.

In one embodiment of the present invention, the at least one mono-substituted succinic anhydride consists of succinic anhydride mono-substituted with one group being a linear and aliphatic group having a total amount of carbon atoms from C2 to C30, preferably from C3 to C20 and most preferably from C4 to C18 in the substituent. Additionally or alternatively, the at least one mono-substituted succinic anhydride consists of succinic anhydride mono-substituted with one group being a branched and aliphatic group having a total amount of carbon atoms from C2 to C30, preferably from C3 to C20 and most preferably from C4 to C18 in the substituent.

Thus, it is preferred that the at least one mono-substituted succinic anhydride consists of succinic anhydride mono-substituted with one group being a linear or branched, alkyl group having a total amount of carbon atoms from C2 to C30, preferably from C3 to C20 and most preferably from C4 to C18 in the substituent.

For example, the at least one mono-substituted succinic anhydride consists of succinic anhydride mono-substituted with one group being a linear alkyl group having a total amount of carbon atoms from C2 to C30, preferably from C3 to C20 and most preferably from C4 to C18 in the substituent. Additionally or alternatively, the at least one mono-substituted succinic anhydride consists of succinic anhydride mono-substituted with one group being a branched alkyl group having a total amount of carbon atoms from C2 to C30, preferably from C3 to C20 and most preferably from C4 to C18 in the substituent.

The term "alkyl" in the meaning of the present invention refers to a linear or branched, saturated organic compound composed of carbon and hydrogen. In other words, "alkyl mono-substituted succinic anhydrides" are composed of linear or branched, saturated hydrocarbon chains containing a pendant succinic anhydride group.

In one embodiment of the present invention, the at least one mono-substituted succinic anhydride is at least one alkyl mono-substituted succinic anhydride.

Preferably, the at least one alkyl mono-substituted succinic anhydride is at least one linear or branched alkyl mono-substituted succinic anhydride. For example, the at least one alkyl mono-substituted succinic anhydride is selected from the group comprising ethylsuccinic anhydride, propylsuccinic anhydride, butylsuccinic anhydride, triisobutyl succinic anhydride, pentylsuccinic anhydride, hexylsuccinic anhydride, heptylsuccinic anhydride, octylsuccinic anhydride, nonylsuccinic anhydride, decyl succinic anhydride, dodecyl succinic anhydride, hexadecanyl succinic anhydride, octadecanyl succinic anhydride and mixtures thereof.

Accordingly, it is appreciated that e.g., the term "butylsuccinic anhydride" comprises linear and branched butylsuccinic anhydride(s). One specific example of linear butylsuccinic anhydride(s) is n-butylsuccinic anhydride. Specific examples of branched butylsuccinic anhydride(s) are iso-butylsuccinic anhydride, sec-butylsuccinic anhydride and/or tert-butylsuccinic anhydride.

Furthermore, it is appreciated that e.g., the term "hexadecanyl succinic anhydride" comprises linear and branched hexadecanyl succinic anhydride(s). One specific example of linear hexadecanyl succinic anhydride(s) is n-hexadecanyl succinic anhydride. Specific examples of branched hexadecanyl succinic anhydride(s) are 14-methylpentadecanyl succinic anhydride, 13-methylpentadecanyl succinic anhydride, 12-methylpentadecanyl succinic anhydride, 11-methylpentadecanyl succinic anhydride, 10-methylpentadecanyl succinic anhydride, 9-methylpentadecanyl succinic anhydride, 8-methylpentadecanyl succinic anhydride, 7-methylpentadecanyl succinic anhydride, 6-methylpentadecanyl succinic anhydride, 5-methylpentadecanyl succinic anhydride, 4-methylpentadecanyl succinic anhydride, 3-methylpentadecanyl succinic anhydride, 2-methylpentadecanyl succinic anhydride, 1-methylpentadecanyl succinic anhydride, 13-ethylbutadecanyl succinic anhydride, 12-ethylbutadecanyl succinic anhydride, 11-ethylbutadecanyl succinic anhydride, 10-ethylbutadecanyl succinic anhydride. 9-ethylbutadecanyl succinic anhydride, 8-ethylbutadecanyl succinic anhydride, 7-ethylbutadecanyl succinic anhydride, 6-ethylbutadecanyl succinic anhydride, 5-ethylbutadecanyl succinic anhydride, 4-ethylbutadecanyl succinic anhydride, 3-ethylbutadecanyl succinic anhydride, 2-ethylbutadecanyl succinic anhydride, 1-ethylbutadecanyl succinic anhydride, 2-butyldodecanyl succinic anhydride, 1-hexyldecanyl succinic anhydride, 1-hexyl-2-decanyl succinic anhydride, 2-hexyldecanyl succinic anhydride, 6,12-dimethylbutadecanyl succinic anhydride, 2,2-diethyldodecanyl succinic anhydride, 4,8,12-trimethyltridecanyl succinic anhydride, 2,2,4,6,8-pentamethylundecanyl succinic anhydride, 2-ethyl-4-methyl-2-(2-methylpentyl)-heptyl succinic anhydride and/or 2-ethyl-4,6-dimethyl-2-propylnonyl succinic anhydride.

Furthermore, it is appreciated that e.g., the term "octadecanyl succinic anhydride" comprises linear and branched octadecanyl succinic anhydride(s). One specific example of linear octadecanyl succinic anhydride(s) is n-octadecanyl succinic anhydride. Specific examples of branched hexadecanyl succinic anhydride(s) are 16-methylheptadecanyl succinic anhydride, 15-methylheptadecanyl succinic anhydride, 14-methylheptadecanyl succinic anhydride, 13-methylheptadecanyl succinic anhydride, 12-methylheptadecanyl succinic anhydride, 11-methylheptadecanyl succinic anhydride, 10-methylheptadecanyl succinic anhydride, 9-methylheptadecanyl succinic anhydride, 8-methylheptadecanyl succinic anhydride, 7-methylheptadecanyl succinic anhydride, 6-methylheptadecanyl succinic anhydride, 5-methylheptadecanyl succinic anhydride, 4-methylheptadecanyl succinic anhydride, 3-methylheptadecanyl succinic anhydride, 2-methylheptadecanyl succinic anhydride, 1-methylheptadecanyl succinic anhydride, 14-ethylhexadecanyl succinic anhydride, 13-ethylhexadecanyl succinic anhydride, 12-ethylhexadecanyl succinic anhydride, 11-ethylhexadecanyl succinic anhydride, 10-ethylhexadecanyl succinic anhydride, 9-ethylhexadecanyl succinic anhydride, 8-ethylhexadecanyl succinic anhydride, 7-ethylhexadecanyl succinic anhydride, 6-ethylhexadecanyl succinic anhydride, 5-ethylhexadecanyl succinic anhydride, 4-ethylhexadecanyl succinic anhydride, 3-ethylhexadecanyl succinic anhydride, 2-ethylhexadecanyl succinic anhydride, 1-ethylhexadecanyl succinic anhydride, 2-hexyldodecanyl succinic anhydride, 2-heptylundecanyl succinic anhydride, iso-octadecanyl succinic anhydride and/or 1-octyl-2-decanyl succinic anhydride.

In one embodiment of the present invention, the at least one alkyl mono-substituted succinic anhydride is selected from the group comprising butylsuccinic anhydride, hexylsuccinic anhydride, heptylsuccinic anhydride, octylsuccinic anhydride, hexadecanyl succinic anhydride, octadecanyl succinic anhydride, and mixtures thereof.

In one embodiment of the present invention, the at least one alkyl mono-substituted succinic anhydride is one kind of alkyl mono-substituted succinic anhydride. For example, the one alkyl mono-substituted succinic anhydride is butylsuccinic anhydride. Alternatively, the one alkyl mono-substituted succinic anhydride is hexylsuccinic anhydride. Alternatively, the one alkyl mono-substituted succinic anhydride is heptylsuccinic anhydride or octylsuccinic anhydride. Alternatively, the one alkyl mono-substituted succinic anhydride is hexadecanyl succinic anhydride. For example, the one alkyl mono-substituted succinic anhydride is linear hexadecanyl succinic anhydride such as n-hexadecanyl succinic anhydride or branched hexadecanyl succinic anhydride such as 1-hexyl-2-decanyl succinic anhydride. Alternatively, the one alkyl mono-substituted succinic anhydride is octadecanyl succinic anhydride. For example, the one alkyl mono-substituted succinic anhydride is linear octadecanyl succinic anhydride such as n-octadecanyl succinic anhydride or branched octadecanyl succinic anhydride such as iso-octadecanyl succinic anhydride or 1-octyl-2-decanyl succinic anhydride.

In one embodiment of the present invention, the one alkyl mono-substituted succinic anhydride is butylsuccinic anhydride such as n-butylsuccinic anhydride.

In one embodiment of the present invention, the at least one mono-substituted succinic anhydride is a mixture of two or more kinds of alkyl mono-substituted succinic anhydrides. For example, the at least one mono-substituted succinic anhydride is a mixture of two or three kinds of alkyl mono-substituted succinic anhydrides.

In one embodiment of the present invention, the at least one mono-substituted succinic anhydride consists of succinic anhydride mono-substituted with one group being a linear or branched alkenyl group having a total amount of carbon atoms from C2 to C30, preferably from C3 to C20 and most preferably from C4 to C18 in the substituent.

The term "alkenyl" in the meaning of the present invention refers to a linear or branched, unsaturated organic compound composed of carbon and hydrogen. Said organic compound further contains at least one double bond in the substituent, preferably one double bond. In other words, "alkenyl mono-substituted succinic anhydrides" are composed of linear or branched, unsaturated hydrocarbon chains containing a pendant succinic anhydride group. It is appreciated that the term "alkenyl" in the meaning of the present invention includes the cis and trans isomers.

In one embodiment of the present invention, the at least one mono-substituted succinic anhydride is at least one linear or branched alkenyl mono-substituted succinic anhydride. For example, the at least one alkenyl mono-substituted succinic anhydride is selected from the group comprising ethenylsuccinic anhydride, propenylsuccinic anhydride, butenylsuccinic anhydride, triisobutenyl succinic anhydride, pentenylsuccinic anhydride, hexenylsuccinic anhydride, heptenylsuccinic anhydride, octenylsuccinic anhydride, nonenylsuccinic anhydride, decenyl succinic anhydride, dodecenyl succinic anhydride, hexadecenyl succinic anhydride, octadecenyl succinic anhydride, and mixtures thereof.

Accordingly, it is appreciated that e.g., the term "hexadecenyl succinic anhydride" comprises linear and branched hexadecenyl succinic anhydride(s). One specific example of linear hexadecenyl succinic anhydride(s) is n-hexadecenyl succinic anhydride such as 14-hexadecenyl succinic anhydride, 13-hexadecenyl succinic anhydride, 12-hexadecenyl succinic anhydride, 11-hexadecenyl succinic anhydride, 10-hexadecenyl succinic anhydride, 9-hexadecenyl succinic anhydride, 8-hexadecenyl succinic anhydride, 7-hexadecenyl succinic anhydride, 6-hexadecenyl succinic anhydride, 5-hexadecenyl succinic anhydride, 4-hexadecenyl succinic anhydride, 3-hexadecenyl succinic anhydride and/or 2-hexadecenyl succinic anhydride. Specific examples of branched hexadecenyl succinic anhydride(s) are 14-methyl-9-pentadecenyl succinic anhydride, 14-methyl-2-pentadecenyl succinic anhydride, 1-hexyl-2-decenyl succinic anhydride and/or iso-hexadecenyl succinic anhydride.

Furthermore, it is appreciated that e.g., the term "octadecenyl succinic anhydride" comprises linear and branched octadecenyl succinic anhydride(s). One specific example of linear octadecenyl succinic anhydride(s) is n-octadecenyl succinic anhydride such as 16-octadecenyl succinic anhydride, 15-octadecenyl succinic anhydride, 14-octadecenyl succinic anhydride, 13-octadecenyl succinic anhydride, 12-octadecenyl succinic anhydride, 11-octadecenyl succinic anhydride, 10-octadecenyl succinic anhydride, 9-octadecenyl succinic anhydride, 8-octadecenyl succinic anhydride, 7-octadecenyl succinic anhydride, 6-octadecenyl succinic anhydride, 5-octadecenyl succinic anhydride, 4-octadecenyl succinic anhydride, 3-octadecenyl succinic anhydride and/or 2-octadecenyl succinic anhydride. Specific examples of branched octadecenyl succinic anhydride(s) are 16-methyl-9-heptadecenyl succinic anhydride, 16-methyl-7-heptadecenyl succinic anhydride, 1-octyl-2-decenyl succinic anhydride and/or iso-octadecenyl succinic anhydride.

In one embodiment of the present invention, the at least one alkenyl mono-substituted succinic anhydride is selected from the group comprising hexenylsuccinic anhydride, octenylsuccinic anhydride, hexadecenyl succinic anhydride, octadecenyl succinic anhydride, and mixtures thereof.

In one embodiment of the present invention, the at least one mono-substituted succinic anhydride is one alkenyl mono-substituted succinic anhydride. For example, the one alkenyl mono-substituted succinic anhydride is hexenylsuccinic anhydride. Alternatively, the one alkenyl mono-substituted succinic anhydride is octenylsuccinic anhydride. Alternatively, the one alkenyl mono-substituted succinic anhydride is hexadecenyl succinic anhydride. For example, the one alkenyl mono-substituted succinic anhydride is linear hexadecenyl succinic anhydride such as n-hexadecenyl succinic anhydride or branched hexadecenyl succinic anhydride such as 1-hexyl-2-decenyl succinic anhydride. Alternatively, the one alkenyl mono-substituted succinic anhydride is octadecenyl succinic anhydride. For example, the one alkyl mono-substituted succinic anhydride is linear octadecenyl succinic anhydride such as n-octadecenyl succinic anhydride or branched octadecenyl succinic anhydride such iso-octadecenyl succinic anhydride, or 1-octyl-2-decenyl succinic anhydride.

In one embodiment of the present invention, the one alkenyl mono-substituted succinic anhydride is linear octadecenyl succinic anhydride such as n-octadecenyl succinic anhydride. In another embodiment of the present invention, the one alkenyl mono-substituted succinic anhydride is linear octenylsuccinic anhydride such as n-octenylsuccinic anhydride.

If the at least one mono-substituted succinic anhydride is one alkenyl mono-substituted succinic anhydride, it is appreciated that the one alkenyl mono-substituted succinic anhydride is present in an amount of ≥95.0 wt.-% and preferably of ≥96.5 wt.-%, based on the total weight of the at least one mono-substituted succinic anhydride.

In one embodiment of the present invention, the at least one mono-substituted succinic anhydride is a mixture of two or more kinds of alkenyl mono-substituted succinic anhydrides. For example, the at least one mono-substituted succinic anhydride is a mixture of two or three kinds of alkenyl mono-substituted succinic anhydrides.

If the at least one mono-substituted succinic anhydride is a mixture of two or more kinds of alkenyl mono-substituted succinic anhydrides, one alkenyl mono-substituted succinic anhydride is linear or branched octadecenyl succinic anhydride, while each further alkenyl mono-substituted succinic anhydride is selected from ethenylsuccinic anhydride, propenylsuccinic anhydride, butenylsuccinic anhydride, pentenylsuccinic anhydride, hexenylsuccinic anhydride, heptenylsuccinic anhydride, nonenylsuccinic anhydride, hexadecenyl succinic anhydride and mixtures thereof. For example, the at least one mono-substituted succinic anhydride is a mixture of two or more kinds of alkenyl mono-substituted succinic anhydrides, wherein one alkenyl mono-substituted succinic anhydride is linear octadecenyl succinic anhydride and each further alkenyl mono-substituted succinic anhydride is selected from ethenylsuccinic anhydride, propenylsuccinic anhydride, butenylsuccinic anhydride, pentenylsuccinic anhydride, hexenylsuccinic anhydride, heptenylsuccinic anhydride, nonenylsuccinic anhydride, hexadecenyl succinic anhydride and mixtures thereof. Alternatively, the at least one mono-substituted succinic anhydride is a mixture of two or more kinds of alkenyl mono-substituted succinic anhydrides, wherein one alkenyl mono-substituted succinic anhydride is branched octadecenyl succinic anhydride and each further alkenyl mono-substituted succinic anhydride is selected from ethenylsuccinic anhydride, propenylsuccinic anhydride, butenylsuccinic anhydride, pentenylsuccinic anhydride, hexenylsuccinic anhydride, heptenylsuccinic anhydride, nonenylsuccinic anhydride, hexadecenyl succinic anhydride and mixtures thereof.

For example, the at least one mono-substituted succinic anhydride is a mixture of two or more kinds of alkenyl mono-substituted succinic anhydrides comprising one or more hexadecenyl succinic anhydride, like linear or branched hexadecenyl succinic anhydride(s), and one or more octadecenyl succinic anhydride, like linear or branched octadecenyl succinic anhydride(s).

In one embodiment of the present invention, the at least one mono-substituted succinic anhydride is a mixture of two or more kinds of alkenyl mono-substituted succinic anhydrides comprising linear hexadecenyl succinic anhydride(s) and linear octadecenyl succinic anhydride(s). Alternatively, the at least one mono-substituted succinic anhydride is a mixture of two or more kinds of alkenyl mono-substituted succinic anhydrides comprising branched hexadecenyl succinic anhydride(s) and branched octadecenyl succinic anhydride(s). For example, the one or more hexadecenyl succinic anhydride is linear hexadecenyl succinic anhydride like n-hexadecenyl succinic anhydride and/or branched hexadecenyl succinic anhydride like 1-hexyl-2-decenyl succinic anhydride. Additionally or alternatively, the one or more octadecenyl succinic anhydride is linear octadecenyl succinic anhydride like n-octadecenyl succinic anhydride and/or branched octadecenyl succinic anhydride like iso-octadecenyl succinic anhydride and/or 1-octyl-2-decenyl succinic anhydride.

If the at least one mono-substituted succinic anhydride is a mixture of two or more kinds of alkenyl mono-substituted succinic anhydrides, it is appreciated that one alkenyl mono-substituted succinic anhydride is present in an amount of from 20.0 to 60.0 wt.-% and preferably of from 30.0 to 50.0 wt.-%, based on the total weight of the at least one mono-substituted succinic anhydride.

For example, if the at least one mono-substituted succinic anhydride is a mixture of two or more kinds of alkenyl mono-substituted succinic anhydrides comprising one or more hexadecenyl succinic anhydride(s), like linear or branched hexadecenyl succinic anhydride(s), and one or more octadecenyl succinic anhydride(s), like linear or branched hexadecenyl succinic anhydride(s), it is preferred that the one or more octadecenyl succinic anhydride(s) is present in an amount of from 20.0 to 60.0 wt.-% and preferably of from 30.0 to 50.0 wt.-%, based on the total weight of the at least one mono-substituted succinic anhydride.

It is also appreciated that the at least one mono-substituted succinic anhydride can be a mixture of at least one alkyl mono-substituted succinic anhydride and at least one alkenyl mono-substituted succinic anhydride.

If the at least one mono-substituted succinic anhydride is a mixture of at least one alkyl mono-substituted succinic anhydrides and at least one alkenyl mono-substituted succinic anhydrides, it is appreciated that the alkyl substituent of the of at least one alkyl mono-substituted succinic anhydrides and the alkenyl substituent of the of at least one alkenyl mono-substituted succinic anhydrides are preferably the same. For example, the at least one mono-substituted succinic anhydride is a mixture of ethylsuccinic anhydride and ethenylsuccinic anhydride. Alternatively, the at least one mono-substituted succinic anhydride is a mixture of propylsuccinic anhydride and propenylsuccinic anhydride. Alternatively, the at least one mono-substituted succinic anhydride is a mixture of butylsuccinic anhydride and butenylsuccinic anhydride. Alternatively, the at least one mono-substituted succinic anhydride is a mixture of triisobutyl succinic anhydride and triisobutenyl succinic anhydride. Alternatively, the at least one mono-substituted succinic anhydride is a mixture of pentylsuccinic anhydride and pentenylsuccinic anhydride. Alternatively, the at least one mono-substituted succinic anhydride is a mixture of hexylsuccinic anhydride and hexenylsuccinic anhydride. Alternatively, the at least one mono-substituted succinic anhydride is a mixture of heptylsuccinic anhydride and heptenylsuccinic anhydride. Alternatively, the at least one mono-substituted succinic anhydride is a mixture of octylsuccinic anhydride and octenylsuccinic anhydride. Alternatively, the at least one mono-substituted succinic anhydride is a mixture of nonylsuccinic anhydride and nonenylsuccinic anhydride. Alternatively, the at least one mono-substituted succinic anhydride is a mixture of decyl succinic anhydride and decenyl succinic anhydride. Alternatively, the at least one mono-substituted succinic anhydride is a mixture of dodecyl succinic anhydride and dodecenyl succinic anhydride. Alternatively, the at least one mono-substituted succinic anhydride is a mixture of hexadecanyl succinic anhydride and hexadecenyl succinic anhydride. For example, the at least one mono-substituted succinic anhydride is a mixture of linear hexadecanyl succinic anhydride and linear hexadecenyl succinic anhydride or a mixture of branched hexadecanyl succinic anhydride and branched hexadecenyl succinic anhydride. Alternatively, the at least one mono-substituted succinic anhydride is a mixture of octadecanyl succinic anhydride and octadecenyl succinic anhydride. For example, the at least one mono-substituted succinic anhydride is a mixture of linear octadecanyl succinic anhydride and linear octadecenyl succinic anhydride or a mixture of branched octadecanyl succinic anhydride and branched octadecenyl succinic anhydride.

In one embodiment of the present invention, the at least one mono-substituted succinic anhydride is a mixture of nonylsuccinic anhydride and nonenylsuccinic anhydride.

If the treatment layer of the surface modified earth alkali carbonate-containing filler material comprises at least one mono-substituted succinic anhydride, the treatment layer further comprises salty reaction products obtained from contacting the at least one earth alkali carbonate-containing filler material with the at least one mono-substituted succinic anhydride. In such a case, the treatment layer of the surface modified earth alkali carbonate-containing filler material preferably comprises salty reaction products such as one or more calcium and/or magnesium salts of the at least one mono-substituted succinic anhydride.

Additionally or alternatively, the treatment layer of the surface modified earth alkali carbonate-containing filler material can further comprise at least one alkyl phosphoric acid ester and salty reaction products thereof.

It is appreciated that the expression "at least one" alkyl phosphoric acid ester means that one or more kinds of alkyl phosphoric acid ester and the corresponding salty reaction products thereof can be present in the treatment layer of the inventive surface modified earth alkali carbonate-containing filler material.

Accordingly, it should be noted that the at least one alkyl phosphoric acid ester can be one kind of an alkyl phosphoric acid ester. Alternatively, the at least one alkyl phosphoric acid ester can be a mixture of two or more kinds of alkyl phosphoric acid esters. For example, the at least one alkyl phosphoric acid ester may be a mixture of two or three kinds of alkyl phosphoric acid esters, like two kinds of alkyl phosphoric acid esters.

In one embodiment of the present invention, the at least one alkyl phosphoric acid ester is one kind of an alkyl phosphoric acid ester.

In one embodiment of the present invention, the at least one alkyl phosphoric acid ester is an alkyl phosphoric acid ester blend. For example, the alkyl phosphoric acid ester blend comprises one or more phosphoric acid mono-ester and/or one or more phosphoric acid di-ester and/or one or more phosphoric acid tri-ester and optionally phosphoric acid.

It is appreciated that the expression "one or more" phosphoric acid mono-ester means that one or more kinds of phosphoric acid mono-ester can be present in the treatment layer of the inventive surface modified earth alkali carbonate-containing filler material and/or the phosphoric acid ester blend.

Accordingly, it should be noted that the one or more phosphoric acid mono-ester may be one kind of phosphoric acid mono-ester. Alternatively, the one or more phosphoric acid mono-ester may be a mixture of two or more kinds of phosphoric acid mono-esters. For example, the one or more phosphoric acid mono-ester may be a mixture of two or three kinds of phosphoric acid mono-esters, like two kinds of phosphoric acid mono-esters.

In one embodiment of the present invention, the one or more phosphoric acid mono-ester consists of an o-phosphoric acid molecule esterified with one alcohol selected from unsaturated or saturated, branched or linear, aliphatic or aromatic alcohols having a total amount of carbon atoms from C6 to C30 in the alcohol substituent. For example, the one or more phosphoric acid mono-ester consists of an o-phosphoric acid molecule esterified with one alcohol selected from unsaturated or saturated, branched or linear, aliphatic or aromatic alcohols having a total amount of carbon atoms from C8 to C22, more preferably from C8 to C20 and most preferably from C8 to C18 in the alcohol substituent.

In one embodiment of the present invention, the one or more phosphoric acid mono-ester is selected from the group comprising hexyl phosphoric acid mono-ester, heptyl phosphoric acid mono-ester, octyl phosphoric acid mono-ester, 2-ethylhexyl phosphoric acid mono-ester, nonyl phosphoric acid mono-ester, decyl phosphoric acid mono-ester, undecyl phosphoric acid mono-ester, dodecyl phosphoric acid mono-ester, tetradecyl phosphoric acid mono-ester, hexadecyl phosphoric acid mono-ester, heptylnonyl phosphoric acid mono-ester, octadecyl phosphoric acid mono-ester, 2-octyl-1-decylphosphoric acid mono-ester, 2-octyl-1-dodecylphosphoric acid mono-ester and mixtures thereof.

For example, the one or more phosphoric acid mono-ester is selected from the group comprising 2-ethylhexyl phosphoric acid mono-ester, hexadecyl phosphoric acid mono-ester, heptylnonyl phosphoric acid mono-ester, octadecyl phosphoric acid mono-ester, 2-octyl-1-decylphosphoric acid mono-ester, 2-octyl-1-dodecylphosphoric acid mono-ester and mixtures thereof. In one embodiment of the present invention, the one or more phosphoric acid mono-ester is 2-octyl-1-dodecylphosphoric acid mono-ester.

It is appreciated that the expression "one or more" phosphoric acid di-ester means that one or more kinds of phosphoric acid di-ester can be present in the treatment layer of the inventive surface modified earth alkali carbonate-containing filler material and/or the phosphoric acid ester blend.

Accordingly, it should be noted that the one or more phosphoric acid di-ester may be one kind of phosphoric acid di-ester. Alternatively, the one or more phosphoric acid di-ester may be a mixture of two or more kinds of phosphoric acid di-ester. For example, the one or more phosphoric acid di-ester may be a mixture of two or three kinds of phosphoric acid di-ester, like two kinds of phosphoric acid di-ester.

In one embodiment of the present invention, the one or more phosphoric acid di-ester consists of an o-phosphoric acid molecule esterified with two alcohols selected from unsaturated or saturated, branched or linear, aliphatic or aromatic alcohols having a total amount of carbon atoms from C6 to C30 in the alcohol substituent. For example, the one or more phosphoric acid di-ester consists of an o-phosphoric acid molecule esterified with two fatty alcohols selected from unsaturated or saturated, branched or linear, aliphatic or aromatic alcohols having a total amount of carbon atoms from C8 to C22, more preferably from C8 to C20 and most preferably from C8 to C18 in the alcohol substituent.

It is appreciated that the two alcohols used for esterifying the phosphoric acid may be independently selected from the same or different, unsaturated or saturated, branched or linear, aliphatic or aromatic alcohols having a total amount of carbon atoms from C6 to C30 in the alcohol substituent. In other words, the one or more phosphoric acid di-ester may comprise two substituents being derived from the same alcohols or the phosphoric acid di-ester molecule may comprise two substituents being derived from different alcohols.

In one embodiment of the present invention, the one or more phosphoric acid di-ester is selected from the group comprising hexyl phosphoric acid di-ester, heptyl phosphoric acid di-ester, octyl phosphoric acid di-ester, 2-ethylhexyl phosphoric acid di-ester, nonyl phosphoric acid di-ester, decyl phosphoric acid di-ester, undecyl phosphoric acid di-ester, dodecyl phosphoric acid di-ester, tetradecyl phosphoric acid di-ester, hexadecyl phosphoric acid di-ester, heptylnonyl phosphoric acid di-ester, octadecyl phosphoric acid di-ester, 2-octyl-1-decylphosphoric acid di-ester, 2-octyl-1-dodecylphosphoric acid di-ester and mixtures thereof.

For example, the one or more phosphoric acid di-ester is selected from the group comprising 2-ethylhexyl phosphoric acid di-ester, hexadecyl phosphoric acid di-ester, heptylnonyl phosphoric acid di-ester, octadecyl phosphoric acid di-ester, 2-octyl-1-decylphosphoric acid di-ester, 2-octyl-1-dodecylphosphoric acid di-ester and mixtures thereof. In one embodiment of the present invention, the one or more phosphoric acid di-ester is 2-octyl-1-dodecylphosphoric acid di-ester.

The term "phosphoric acid tri-ester" in the meaning of the present invention refers to an o-phosphoric acid molecule tri-esterified with three alcohol molecules selected from the same or different, unsaturated or saturated, branched or linear, aliphatic or aromatic alcohols having a total amount of carbon atoms from C6 to C30, preferably from C8 to C22, more preferably from C8 to C20 and most preferably from C8 to C18 in the alcohol substituent.

It is appreciated that the expression "one or more" phosphoric acid tri-ester means that one or more kinds of phosphoric acid tri-ester can be present in the phosphoric acid ester blend and/or the treatment layer of the inventive surface modified earth alkali carbonate-containing filler material.

Accordingly, it should be noted that the one or more phosphoric acid tri-ester may be one kind of phosphoric acid tri-ester. Alternatively, the one or more phosphoric acid tri-ester may be a mixture of two or more kinds of phosphoric acid tri-ester. For example, the one or more phosphoric acid tri-ester may be a mixture of two or three kinds of phosphoric acid tri-ester, like two kinds of phosphoric acid tri-ester.

In one embodiment of the present invention, the one or more phosphoric acid tri-ester consists of an o-phosphoric acid molecule esterified with three alcohols selected from the same or different, unsaturated or saturated, branched or linear, aliphatic or aromatic alcohols having a total amount of carbon atoms from C6 to C30 in the alcohol substituent. For example, the one or more phosphoric acid tri-ester consists of an o-phosphoric acid molecule esterified with three alcohols selected from the same or different, unsaturated or saturated, branched or linear, aliphatic or aromatic fatty alcohols having a total amount of carbon atoms from C8 to C22, more preferably from C8 to C20 and most preferably from C8 to C18 in the alcohol substituent.

It is appreciated that the three alcohols used for esterifying the phosphoric acid may be independently selected from unsaturated or saturated, branched or linear, aliphatic or aromatic alcohols having a total amount of carbon atoms from C6 to C30 in the alcohol substituent. In other words, the one or more phosphoric acid tri-ester molecule may comprise three substituents being derived from the same alcohols or the phosphoric acid tri-ester molecule may comprise three substituents being derived from different alcohols.

In one embodiment of the present invention, the one or more phosphoric acid tri-ester consists of an o-phosphoric acid molecule esterified with three alcohols selected from the same or different, saturated and linear or branched and aliphatic alcohols having a total amount of carbon atoms from C6 to C30 in the alcohol substituent. For example, the one or more phosphoric acid tri-ester consists of an o-phosphoric acid molecule esterified with three alcohols selected from the same or different, saturated and linear or branched and aliphatic alcohols having a total amount of carbon atoms from C8 to C22, more preferably from C8 to C20 and most preferably from C8 to C18 in the alcohol substituent.

In one embodiment of the present invention, the one or more phosphoric acid tri-ester consists of an o-phosphoric acid molecule esterified with three alcohols selected from saturated and linear and aliphatic alcohols having a total amount of carbon atoms from C6 to C30, preferably from C8 to C22, more preferably from C8 to C20 and most preferably from C8 to C18 in the alcohol substituent. Alternatively, the one or more phosphoric acid tri-ester consists of an o-phosphoric acid molecule esterified with three alcohols selected from saturated and branched and aliphatic alcohols having a total amount of carbon atoms from C6 to C30, preferably from C8 to C22, more preferably from C8 to C20 and most preferably from C8 to C18 in the alcohol substituent.

In one embodiment of the present invention, the one or more phosphoric acid tri-ester is selected from the group comprising hexyl phosphoric acid tri-ester, heptyl phosphoric acid tri-ester, octyl phosphoric acid tri-ester, 2-ethylhexyl phosphoric acid tri-ester, nonyl phosphoric acid tri-ester, decyl phosphoric acid tri-ester, undecyl phosphoric acid tri-ester, dodecyl phosphoric acid tri-ester, tetradecyl phosphoric acid tri-ester, hexadecyl phosphoric acid tri-ester, heptylnonyl phosphoric acid tri-ester, octadecyl phosphoric acid tri-ester, 2-octyl-1-decylphosphoric acid tri-ester, 2-octyl-1-dodecylphosphoric acid tri-ester and mixtures thereof.

For example, the one or more phosphoric acid tri-ester is selected from the group comprising 2-ethylhexyl phosphoric acid tri-ester, hexadecyl phosphoric acid tri-ester, heptylnonyl phosphoric acid tri-ester, octadecyl phosphoric acid tri-ester, 2-octyl-1-decylphosphoric acid tri-ester, 2-octyl-1-dodecylphosphoric acid tri-ester and mixtures thereof.

If the treatment layer of the surface modified earth alkali carbonate-containing filler material comprises at least one alkyl phosphoric acid ester, the treatment layer further comprises salty reaction products obtained from contacting the at least one earth alkali carbonate-containing filler material with the at least one alkyl phosphoric acid ester. In such a case, the treatment layer of the surface modified earth alkali carbonate-containing filler material preferably comprises salty reaction products such as one or more calcium and/or magnesium salts of the at least one alkyl phosphoric acid ester.

For example, if the at least one alkyl phosphoric acid ester is an alkyl phosphoric acid ester blend comprising one or more phosphoric acid mono-ester and/or one or more phosphoric acid di-ester and/or one or more phosphoric acid tri-ester and optionally phosphoric acid, the treatment layer of the surface modified earth alkali carbonate-containing filler material preferably comprises salty reaction products such as one or more calcium and/or magnesium salts of the one or more phosphoric acid mono-ester and/or one or more calcium and/or magnesium salts of the one or more phosphoric acid di-ester and/or optionally one or more calcium and/or magnesium salts of the phosphoric acid.

If the treatment layer of the surface modified earth alkali carbonate-containing filler material comprises, in addition to the at least one polyhydrogensiloxane and reaction products thereof, at least one saturated aliphatic linear or branched carboxylic acid and salty reaction products thereof, and/or at least one mono-substituted succinic anhydride and salty reaction products thereof and/or at least one alkyl phosphoric acid ester and salty reaction products thereof, the weight ratio of the polyhydrogensiloxane and reaction products thereof to the at least one saturated aliphatic linear or branched carboxylic acid and salty reaction products thereof and/or the at least one mono-substituted succinic anhydride and salty reaction products thereof and/or the at least one alkyl phosphoric acid ester and salty reaction products thereof is from 100:1 to 100:30.

For example, the weight ratio of the polyhydrogensiloxane and reaction products thereof to the at least one saturated aliphatic linear or branched carboxylic acid and salty reaction products thereof and/or the at least one mono-substituted succinic anhydride and salty reaction products thereof and/or the at least one alkyl phosphoric acid ester and salty reaction products thereof is from 80:1 to 100:30, like from 80:10 to 75:20.

Additionally, the total amount of the at least one saturated aliphatic linear or branched carboxylic acid and salty reaction products thereof and/or the at least one mono-substituted succinic anhydride and salty reaction products thereof and/or the at least one alkyl phosphoric acid ester and salty reaction products in the treatment layer of the surface modified earth alkali carbonate-containing filler material is from 0.2 to 0.7 mg/m$^2$, based on the surface modified earth alkali carbonate-containing filler material. For example, the total amount of the at least one saturated aliphatic linear or branched carboxylic acid and salty reaction products thereof and/or the at least one mono-substituted succinic anhydride and salty reaction products thereof and/or the at least one alkyl phosphoric acid ester and salty reaction products in the treatment layer of the surface modified earth alkali carbonate-containing filler material is from 0.3 to 0.6 mg/m$^2$, based on the surface modified earth alkali carbonate-containing filler material.

In one embodiment of the present invention, the surface modified earth alkali carbonate-containing filler material comprises the at least one saturated aliphatic linear or branched carboxylic acid and salty reaction products thereof and/or the at least one mono-substituted succinic anhydride and salty reaction products thereof and/or the at least one alkyl phosphoric acid ester and salty reaction products in the treatment layer in an amount of from 0.02 to 0.6 wt.-%, based on the total dry weight of the surface modified earth alkali carbonate-containing filler material. For example, the surface modified earth alkali carbonate-containing filler material comprises the at least one saturated aliphatic linear or branched carboxylic acid and salty reaction products thereof and/or the at least one mono-substituted succinic anhydride and salty reaction products thereof and/or the at least one alkyl phosphoric acid ester and salty reaction products in the treatment layer in an amount of from 0.02 to 0.5 wt.-% and preferably of from 0.05 to 0.4 wt.-%, based on the total dry weight of the surface modified earth alkali carbonate-containing filler material.

The treatment layer comprising, preferably consisting of, at least one polyhydrogensiloxane and reaction products thereof and the optional at least one saturated aliphatic linear or branched carboxylic acid and salty reaction products thereof and/or at least one mono-substituted succinic anhydride and salty reaction products thereof and/or at least one alkyl phosphoric acid ester and salty reaction products is preferably present such that the total amount of said treatment layer located on at least a part of the surface of the at least one earth alkali carbonate-containing filler material is from 0.7 to 6.0 mg/m$^2$, preferably from 0.7 to 5.0 mg/m$^2$ or from 1.0 to 4.0 mg/m$^2$, based on the surface modified earth alkali carbonate-containing filler material.

Additionally or alternatively, the treatment layer comprising, preferably consisting of, at least one polyhydrogensiloxane and reaction products thereof and the optional at least one saturated aliphatic linear or branched carboxylic acid and salty reaction products thereof and/or at least one mono-substituted succinic anhydride and salty reaction products thereof and/or at least one alkyl phosphoric acid ester and salty reaction products is preferably present such that the total amount of said treatment layer located on at least a part of the surface of the at least one earth alkali carbonate-containing filler material 0.1 to 6.0 wt.-%, based on the total dry weight of the surface modified earth alkali carbonate-containing filler material. For example, the treatment layer comprising, preferably consisting of, at least one polyhydrogensiloxane and reaction products thereof and the optional at least one saturated aliphatic linear or branched carboxylic acid and salty reaction products thereof and/or at least one mono-substituted succinic anhydride and salty reaction products thereof and/or at least one alkyl phosphoric acid ester and salty reaction products is preferably present such that the total amount of said treatment layer located on at least a part of the surface of the at least one earth alkali carbonate-containing filler material 0.2 to 5.0 wt.-% and preferably of from 0.3 to 4.5 wt.-%, based on the total dry weight of the surface modified earth alkali carbonate-containing filler material.

Furthermore, it is appreciated that the surface modified earth alkali carbonate-containing filler material has specific characteristics.

In particular, it is one requirement of the present invention that the surface modified earth alkali carbonate-containing filler material has a volatile onset temperature of ≥350° C. For example, the surface modified earth alkali carbonate-containing filler material features a volatile onset temperature of ≥400° C., preferably of ≥450° C. and most preferably of ≥500° C.

Additionally or alternatively, the surface modified earth alkali carbonate-containing filler material features a total volatiles between 25 and 380° C. of less than 0.25%, and preferably of less than 0.23% by mass, e.g. of from 0.04 to 0.21% by mass, preferably from 0.08 to 0.15% by mass, more preferably from 0.1 to 0.12% by mass.

Regarding the volatile onset temperature, it is to be noted that the surface modified earth alkali carbonate-containing filler material preferably features a higher volatile onset temperature than the same filler material comprising a treatment layer consisting only of at least one saturated aliphatic linear or branched carboxylic acid and salty reaction products thereof and/or at least one mono-substituted succinic anhydride and salty reaction products thereof and/or at least one alkyl phosphoric acid ester and salty reaction products. That is to say, the inventive surface modified earth alkali carbonate-containing filler material preferably features a higher volatile onset temperature if the surface modified earth alkali carbonate-containing filler material comprises, preferably consists of, at least one polyhydrogensiloxane and reaction products thereof.

Additionally or alternatively, the surface modified earth alkali carbonate-containing filler material features a low moisture pick up susceptibility. It is preferred that the moisture pick up susceptibility of the surface modified earth alkali carbonate-containing filler material is such that its total moisture pick up susceptibility is ≤1.2 mg/g of dry surface modified earth alkali carbonate-containing filler material, at a temperature of about +23° C. (±2° C.). For example, the surface modified earth alkali carbonate-containing filler material has a moisture pick up susceptibility of from 1.2 to 0.1 mg/g, preferably from 1.1 to 0.2 mg/g, and more preferably from 1.0 to 0.3 mg/g of dry surface modified earth alkali carbonate-containing filler material at a temperature of +23° C. (±2° C.).

It is further appreciated that the surface modified earth alkali carbonate-containing filler material has a hydrophobicity of above 8:2 volumetric ratio of water:ethanol measured at +23° C. (±2° C.) with the sedimentation method. For example, the surface modified earth alkali carbonate-containing filler material has a hydrophobicity of below 7:3 volumetric ratio of water:ethanol measured at +23° C. (±2° C.) with the sedimentation method.

In one embodiment of the present invention, the surface modified earth alkali carbonate-containing filler material, such as the surface modified calcium carbonate-containing filler material, has been obtained by a process as described below.

According to another aspect of the present invention, a process for preparing the surface modified earth alkali carbonate-containing filler material as defined above is provided. The process comprises at least the steps of:

a) providing at least one earth alkali carbonate-containing filler material;
b) providing at least one polyhydrogensiloxane;
c) contacting the at least one earth alkali carbonate-containing filler material of step a), in one or more steps at a temperature of from 40 to 200° C., with the at least one polyhydrogensiloxane of step b) such that the total amount of the at least one polyhydrogensiloxane added is from 0.7 to 6.0 mg/m², based on the at least one earth alkali carbonate-containing filler material of step a),
d) contacting the at least one earth alkali carbonate-containing filler material of step a) before and/or during and/or after contacting step c), in one or more steps, with water, and
e) forming a treatment layer comprising the at least one polyhydrogensiloxane of step b) and reaction products thereof on at least a part of the surface of the at least one earth alkali carbonate-containing filler material of step a) such as to obtain a surface modified earth alkali carbonate-containing filler material having a volatile onset temperature of ≥350° C.

With regard to the surface modified earth alkali carbonate-containing filler material prepared by the process, the at least one earth alkali carbonate-containing filler material provided in step a) the at least one polyhydrogensiloxane provided in step b) and the reaction products of the at least one polyhydrogensiloxane as formed in the treatment layer of step e), it is referred to the definitions set out above when defining the surface modified earth alkali carbonate-containing filler material, the at least one earth alkali carbonate-containing filler material and the at least one polyhydrogensiloxane and the reaction products thereof.

It is one requirement of the present invention that the at least one polyhydrogensiloxane of step b) is provided such that the total amount of the at least one polyhydrogensiloxane added in contacting step c) is from 0.7 to 6.0 mg/m², based on the at least one earth alkali carbonate-containing filler material of step a). In one embodiment of the present invention, the at least one polyhydrogensiloxane of step b) is provided such that the total amount of the at least one polyhydrogensiloxane added in contacting step c) is from 0.7 to 5.0 mg/m² or from 1.0 to 4.0 mg/m², based on the at least one earth alkali carbonate-containing filler material of step a).

The step of contacting the at least one earth alkali carbonate-containing filler material provided in step a), in one or more steps, with the at least one polyhydrogensiloxane of step b) preferably takes place under mixing conditions. The skilled man will adapt these mixing conditions (such as the configuration of mixing pallets and mixing speed) according to his process equipment.

In one embodiment of the present invention, the process may be a continuous process. In this case, it is possible to contact the at least one earth alkali carbonate-containing filler material of step a) with the at least one polyhydrogensiloxane of step b) in a constant flow such that a constant concentration of the at least one polyhydrogensiloxane is provided during the step of contacting.

Alternatively, the at least one earth alkali carbonate-containing filler material of step a) is contacted with the at least one polyhydrogensiloxane of step b) in one step, wherein said at least one polyhydrogensiloxane is preferably added in one portion.

In another embodiment, the inventive process may be a batch process, i.e., the at least one earth alkali carbonate-containing filler material of step a) is contacted with the at least one polyhydrogensiloxane of step b) in more than one step, wherein said at least one polyhydrogensiloxane is preferably added in about equal portions. Alternatively, it is also possible to add the at least one polyhydrogensiloxane in unequal portions to the at least one earth alkali carbonate-containing filler material, i.e., in larger and smaller portions.

According to one embodiment of the present invention, contacting step (c) is carried out in a batch or continuous process for a period of time from 0.1 to 1 000 s. For example, contacting step c) is a continuous process and comprises one or several contacting steps and the total contacting time is from 0.1 to 20 s, preferably from 0.5 to 15 s and most preferably from 1 to 10 s.

It is appreciated that the temperature during contacting step c) is preferably adjusted such that the at least one polyhydrogensiloxane of step b) is liquid.

A "liquid" state in the meaning of the present invention is defined as the state in which a material is entirely liquid, in other words is entirely melted. Whereas the phenomenon of melting occurs at constant temperature on application of energy, a substance is qualified as being molten as of the moment following melting when the temperature begins to rise, as observed on a curve plotting temperature versus energy input obtained by Dynamic Scanning Calorimetry, DSC, (DIN 51005: 1983-11).

The liquid state of the at least one polyhydrogensiloxane is advantageous as it can be more homogeneously located on at least a part of the surface of the at least one earth alkali carbonate-containing filler material of step a). It is thus one requirement of the present invention that the contacting of the at least one calcium carbonate-containing filler material of step a) with the at least one polyhydrogensiloxane of step b) in one or more steps is carried out at a temperature of from 40 to 200° C. In one embodiment of the present invention, contacting step c) is carried out at a temperature of from 50 to 180° C., more preferably of from 60 to 150° C. and most preferably of from 60 to 120° C. For example, contacting step c) is carried out at a temperature of from >100 to 120° C., like 105 to 120° C.

The treatment time for carrying out the contacting of the at least one earth alkali carbonate-containing filler material of step a) with the at least one polyhydrogensiloxane of step b) is carried out for a period of 1 000 s or less, preferably for a period of 500 s or less, more preferably for a period of 250 s or less and most preferably from 0.1 to 1 000 s. For example, contacting step c) is carried out for a period of time from 0.1 to 20 s, preferably from 0.5 to 15 s and most preferably from 1 to 10 s. In general, the length of contacting the at least one earth alkali carbonate-containing filler material of step a) with the at least one polyhydrogensiloxane of step b) is determined by the treatment temperature applied during said contacting. For example, where a treatment temperature of about 200° C. is applied, the treatment time is as short as, for example, about 0.1. If a treatment temperature of about 90° C. is applied, the treatment time can be as long as, for example, about 1 000 s.

It is a further requirement of the present process that the process further comprises contacting the at least one earth alkali carbonate-containing filler material of step a) before and/or during and/or after contacting step c), in one or more steps, with water. This contacting step d) is required as only the contacting of the at least one earth alkali carbonate-containing filler material of step a) before and/or during and/or after contacting step c) with water leads to a surface modified earth alkali carbonate-containing filler material having a volatile onset temperature of ≥350° C. That is to say, the contacting of the at least one earth alkali carbonate-containing filler material with the at least one polyhydrogensiloxane in the absence of water leads to a surface modified earth alkali carbonate-containing filler material with no or only very little hydrophobicity.

For example, contacting step d) is carried out before and after the contacting of the at least one earth alkali carbonate-containing filler material of step a) with the at least one polyhydrogensiloxane of step b). Alternatively, contacting step d) is preferably carried out before or after the contacting of the at least one earth alkali carbonate-containing filler material of step a) with the at least one polyhydrogensiloxane of step b).

If the contacting of the at least one earth alkali carbonate-containing filler material of step a) with water is carried out before and/or after contacting the at least one calcium carbonate-containing filler material with the at least one polyhydrogensiloxane, the at least one polyhydrogensiloxane of step b) is preferably provided as undiluted compound. That is to say, the at least one polyhydrogensiloxane of step b) and water are added separately.

In one embodiment of the present invention, contacting step d) is carried out during contacting step c).

If the contacting of the at least one earth alkali carbonate-containing filler material of step a) with water is carried out during contacting the at least one earth alkali carbonate-containing filler material with the at least one polyhydrogensiloxane, the at least one polyhydrogensiloxane of step b) is preferably provided in form of an aqueous emulsion. That is to say, the at least one polyhydrogensiloxane of step b) and water are added together in contacting step c).

For example, the aqueous emulsion provided and added during contacting step c) comprises the at least one polyhydrogensiloxane in an amount of from 20.0 to 99.0 wt.-%, based on the total weight of the aqueous emulsion. In one embodiment of the present invention, the aqueous emulsion provided during contacting step c) comprises the at least one polyhydrogensiloxane in an amount of from 40.0 to 98.0 wt.-% and most preferably from 50.0 to 95.0 wt.-%, based on the total weight of the aqueous emulsion.

In one embodiment of the present invention, the inventive process further comprises contacting the at least one earth alkali carbonate-containing filler material of step a) before and/or during and/or after contacting step c) and/or contacting step d), in one or more steps, with at least one saturated aliphatic linear or branched carboxylic acid, and/or at least one mono-substituted succinic anhydride, and/or at least one alkyl phosphoric acid ester.

With regard to the at least one saturated aliphatic linear or branched carboxylic acid, the at least one mono-substituted succinic anhydride, and the at least one alkyl phosphoric acid ester, it is referred to the definitions set out above when defining the at least one saturated aliphatic linear or branched carboxylic acid, the at least one mono-substituted succinic anhydride and the at least one alkyl phosphoric acid ester.

Preferably, the at least one saturated aliphatic linear or branched carboxylic acid, and/or at least one mono-substituted succinic anhydride, and/or at least one alkyl phosphoric acid ester is/are added as pure compound, i.e., in the undiluted form.

In case, the inventive process further comprises contacting the at least one earth alkali carbonate-containing filler material of step a) with at least one saturated aliphatic linear or branched carboxylic acid, and/or at least one mono-substituted succinic anhydride, and/or at least one alkyl phosphoric acid ester, such contacting is preferably carried out before and/or after the contacting of the at least one calcium carbonate-containing filler material of step a) with the at least one polyhydrogensiloxane of step b). In one embodiment of the present invention, such contacting with the at least one saturated aliphatic linear or branched carboxylic acid, and/or at least one mono-substituted succinic anhydride, and/or at least one alkyl phosphoric acid ester is carried out before or after the contacting of the at least one earth alkali carbonate-containing filler material with the at least one polyhydrogensiloxane.

In one embodiment of the present invention, the contacting of the at least one earth alkali carbonate-containing filler material with the at least one saturated aliphatic linear or branched carboxylic acid, and/or at least one mono-substituted succinic anhydride, and/or at least one alkyl phosphoric acid ester is preferably carried out before the contacting of the at least one earth alkali carbonate-containing filler material of step a) with the at least one polyhydrogensiloxane of step b). Alternatively, the contacting of the at least one earth alkali carbonate-containing filler material with the at least one saturated aliphatic linear or branched carboxylic acid, and/or at least one mono-substituted succinic anhydride, and/or at least one alkyl phosphoric acid ester is preferably carried out after the contacting of the at least one earth alkali carbonate-containing filler material of step a) with the at least one polyhydrogensiloxane of step b).

Preferably, the contacting of the at least one earth carbonate-containing filler material with the at least one saturated aliphatic linear or branched carboxylic acid, and/or at least one mono-substituted succinic anhydride, and/or at least one alkyl phosphoric acid ester is carried out during the contacting of the at least one earth alkali carbonate-containing filler material of step a) with the at least one polyhydrogensiloxane of step b). That is to say, the at least one polyhydrogensiloxane of step b) and the at least one saturated aliphatic linear or branched carboxylic acid, and/or at least one mono-substituted succinic anhydride, and/or at least one alkyl phosphoric acid ester are added together in contacting step c).

If the at least one polyhydrogensiloxane of step b) and the at least one saturated aliphatic linear or branched carboxylic acid, and/or at least one mono-substituted succinic anhydride, and/or at least one alkyl phosphoric acid ester and water are added together in contacting step c), the at least one polyhydrogensiloxane of step b) is preferably provided in form of an aqueous emulsion, while the at least one saturated aliphatic linear or branched carboxylic acid, and/or at least one mono-substituted succinic anhydride, and/or at least one alkyl phosphoric acid ester is/are added as pure compound.

It is appreciated that the weight ratio of the at least one polyhydrogensiloxane to the at least one saturated aliphatic linear or branched carboxylic acid and/or the at least one alkyl succinic anhydride and/or the alkyl phosphoric acid ester added before and/or during and/or after contacting step c) and/or contacting step d) is preferably from 100:1 to 100:30. For example, the weight ratio of the at least one polyhydrogensiloxane to the at least one saturated aliphatic linear or branched carboxylic acid and/or the at least one alkyl succinic anhydride and/or the alkyl phosphoric acid ester added before and/or during and/or after contacting step c) and/or contacting step d) is preferably from 80:1 to 100:30, like from 80:10 to 75:20.

In one embodiment of the present invention, the weight ratio of the at least one polyhydrogensiloxane to the at least one saturated aliphatic linear or branched carboxylic acid added before and/or during and/or after contacting step c) and/or contacting step d) is preferably from 100:1 to 100:30, more preferably from 80:1 to 100:30, like from 80:10 to 75:20.

Additionally, the at least one saturated aliphatic linear or branched carboxylic acid, and/or at least one mono-substituted succinic anhydride, and/or at least one alkyl phosphoric acid ester is provided such that the total amount of the at least one saturated aliphatic linear or branched carboxylic acid, and/or at least one mono-substituted succinic anhydride, and/or at least one alkyl phosphoric acid ester added before and/or during and/or after contacting step c) and/or contacting step d) is from 0.2 to 0.7 mg/m$^2$, based on the at least one earth alkali carbonate-containing filler material of step a). In one embodiment of the present invention, the at least one saturated aliphatic linear or branched carboxylic acid, and/or at least one mono-substituted succinic anhydride, and/or at least one alkyl phosphoric acid ester is provided such that the total amount of the at least one saturated aliphatic linear or branched carboxylic acid, and/or at least one mono-substituted succinic anhydride, and/or at least one alkyl phosphoric acid ester added before and/or during and/or after contacting step c) and/or contacting step d) is from 0.3 to 0.6 mg/m$^2$, based on the at least one earth alkali carbonate-containing filler material of step a).

In one embodiment of the present invention, the at least one saturated aliphatic linear or branched carboxylic acid, and/or at least one mono-substituted succinic anhydride, and/or at least one alkyl phosphoric acid ester is/are provided in a blend together with the at least one polyhydrogensiloxane.

The further contacting the at least one earth alkali carbonate-containing filler material of step a), in one or more steps, with the at least one saturated aliphatic linear or branched carboxylic acid, and/or at least one mono-substituted succinic anhydride, and/or at least one alkyl phosphoric acid ester preferably takes place under mixing conditions. The skilled man will adapt these mixing conditions (such as the configuration of mixing pallets and mixing speed) according to his process equipment.

In one embodiment of the present invention, it is possible to contact the at least one earth alkali carbonate-containing filler material of step a) with the at least one saturated aliphatic linear or branched carboxylic acid, and/or at least one mono-substituted succinic anhydride, and/or at least one alkyl phosphoric acid ester before and/or during and/or after contacting step c) and/or contacting step d) in a constant flow such that a constant concentration of at least one saturated aliphatic linear or branched carboxylic acid, and/or at least one mono-substituted succinic anhydride, and/or at least one alkyl phosphoric acid ester is provided before and/or during and/or after contacting step c) and/or contacting step d).

Alternatively, the at least one earth alkali carbonate-containing filler material of step a) is contacted with the at least one saturated aliphatic linear or branched carboxylic acid, and/or at least one mono-substituted succinic anhydride, and/or at least one alkyl phosphoric acid ester before and/or during and/or after contacting step c) and/or contacting step d) in one step, wherein said at least one saturated aliphatic linear or branched carboxylic acid, and/or at least one mono-substituted succinic anhydride, and/or at least one alkyl phosphoric acid ester is preferably added in one portion.

In another embodiment, the inventive process may be a batch process, i.e., the at least one earth alkali carbonate-containing filler material of step a) is contacted with the at least one saturated aliphatic linear or branched carboxylic acid, and/or at least one mono-substituted succinic anhydride, and/or at least one alkyl phosphoric acid ester before and/or during and/or after contacting step c) and/or contacting step d) in more than one step, wherein said at least one saturated aliphatic linear or branched carboxylic acid, and/or at least one mono-substituted succinic anhydride, and/or at least one alkyl phosphoric acid ester is preferably added in about equal portions. Alternatively, it is also possible to add the at least one saturated aliphatic linear or branched carboxylic acid, and/or at least one mono-substituted succinic anhydride, and/or at least one alkyl phosphoric acid ester before and/or during and/or after contacting step c) and/or contacting step d) in unequal portions to the at least one earth alkali carbonate-containing filler material, i.e., in larger and smaller portions.

In one embodiment of the present invention, the at least one earth alkali carbonate-containing filler material of step a) is preheated, i.e., activated, before contacting step c) is carried out. That is to say, the at least one earth alkali carbonate-containing filler material of step a) is treated at a temperature of from 40 to 200° C., preferably of from 50 to 180° C., more preferably of from 60 to 150° C. and most preferably of from 60 to 120° C. before contacting step c) is carried out.

The treatment time for carrying out the preheating of the at least one earth alkali carbonate-containing filler material of step a) is carried out for a period of 30 min or less, preferably for a period of 20 min or less and more preferably for a period of 15 min or less.

In one embodiment of the present invention, the preheating of the at least one earth alkali carbonate-containing filler material of step a) is carried out at a temperature that is of about equal to the temperature implemented during contacting step c).

The term "equal" temperature in the meaning of the present invention refers to a preheating temperature that is at most 20° C., preferably at most 15° C., more preferably 10° C. and most preferably at most 5° C., below or above the temperature implemented during contacting step c).

Thus, it is appreciated that the treatment layer formed on at least a part of the surface of the at least one earth alkali carbonate-containing filler material of process step e) such as to obtain the surface modified earth alkali carbonate-containing filler material comprises the at least one polyhydrogensiloxane provided in step b) and reaction products thereof and the optional at least one saturated aliphatic linear or branched carboxylic acid and salty reaction products thereof and/or the at least one mono-substituted succinic anhydride and salty reaction products thereof and/or the at least one alkyl phosphoric acid ester and salty reaction products, optionally further added before and/or during and/or after contacting step c) and/or contacting step d), obtained from contacting the at least one earth alkali carbonate-containing filler material with the at least one polyhydrogensiloxane and the optional at least one saturated aliphatic linear or branched carboxylic acid and/or the at least one mono-substituted succinic anhydride and/or the at least one alkyl phosphoric acid ester. In such a case, the treatment layer of the surface modified earth alkali carbonate-containing filler material preferably comprises reaction product(s) of the at least one polyhydrogensiloxane and optionally salty reaction products of at least one saturated aliphatic linear or branched carboxylic acid and/or the at least one mono-substituted succinic anhydride and/or the at least one alkyl phosphoric acid ester. For example, the treatment layer of the surface modified earth alkali carbonate-containing filler material preferably comprises reaction products such as one or more crosslinked reaction products and/or one or more hydroxylated reaction products of the at least one polyhydrogensiloxane and optionally salty reaction product(s) such as one or more calcium salts and/or magnesium salts of the at least one saturated aliphatic linear or branched carboxylic acid and/or the at least one mono-substituted succinic anhydride and/or the at least one alkyl phosphoric acid ester.

With regard to the reaction products of the at least one polyhydrogensiloxane and the salty reaction product(s) of the optional at least one saturated aliphatic linear or branched carboxylic acid and/or the at least one mono-substituted succinic anhydride and/or the at least one alkyl phosphoric acid ester as formed in the treatment layer of step e), it is referred to the definitions set out above when defining the at least one polyhydrogensiloxane and the reaction products thereof, the at least one saturated aliphatic linear or branched carboxylic acid and salty reaction products thereof, the at least one mono-substituted succinic anhydride and salty reaction products thereof and the at least one alkyl phosphoric acid ester and salty reaction products thereof.

Thus, the surface modified earth alkali carbonate-containing filler material obtained in process step e), i.e., surface modified earth alkali carbonate-containing filler material, comprises, preferably consists of, at least one earth alkali carbonate-containing filler material and a treatment layer comprising at least one polyhydrogensiloxane and reaction products thereof and optionally at least one saturated aliphatic linear or branched carboxylic acid and salty reaction products thereof and/or at least one mono-substituted succinic anhydride and salty reaction products thereof and/or at least one alkyl phosphoric acid ester and salty reaction products thereof. The treatment layer is formed in process step e) on the surface of said at least one earth alkali carbonate-containing filler material of step a). It is appreciated that water is preferably not detectable on the surface modified earth alkali carbonate-containing filler material obtained in step e) of the inventive process.

The treatment layer is preferably characterized in that the total weight of the at least one polyhydrogensiloxane and reaction products thereof and the optional at least one saturated aliphatic linear or branched carboxylic acid and salty reaction products thereof and/or the at least one mono-substituted succinic anhydride and salty reaction products thereof and/or the at least one alkyl phosphoric acid ester and salty reaction products thereof on the surface of the surface modified earth alkali carbonate-containing filler material is from 0.7 to 6.0 mg/m$^2$ or from 0.7 to 5.0 mg/m$^2$ or from 1.0 to 4.0 mg/m$^2$, based on e surface modified earth alkali carbonate-containing filler material.

Additionally, the treatment layer comprises the at least one polyhydrogensiloxane and reaction products thereof and the optional at least one saturated aliphatic linear or branched carboxylic acid and salty reaction products thereof and/or the at least one mono-substituted succinic anhydride and salty reaction products thereof and/or the at least one alkyl phosphoric acid ester and salty reaction products thereof on the surface of the surface modified earth alkali carbonate-containing filler material in an amount of from 0.1 to 6.0 wt.-%, based on the total dry weight of the surface modified earth alkali carbonate-containing filler material. For example, the treatment layer comprises the at least one polyhydrogensiloxane and reaction products thereof and the optional at least one saturated aliphatic linear or branched carboxylic acid and salty reaction products thereof and/or the at least one mono-substituted succinic anhydride and salty reaction products thereof and/or the at least one alkyl phosphoric acid ester and salty reaction products thereof on the surface of the surface modified earth alkali carbonate-containing filler material in an amount of from 0.2 to 5.0 wt.-% and preferably of from 0.3 to 4.5 wt.-%, based on the total dry weight of the surface modified earth alkali carbonate-containing filler material.

In view of the very good results of the process for preparing a surface modified earth alkali carbonate-containing filler material, as defined above, a further aspect of the present invention refers to a surface modified earth alkali carbonate-containing filler material which is obtainable by the process according to the present invention.

The surface modified calcium carbonate-containing filler material according to the present invention imparts excellent mechanical properties to final application products such as fibers and/or filaments and/or films and/or threads and/or breathable films. In particular, the surface modified earth alkali carbonate-containing filler material imparts excellent mechanical properties to final application products such as fibers and/or filaments and/or films and/or threads and/or breathable films, when the surface modified earth alkali carbonate-containing filler material is present in a polymer composition.

Thus, the present invention refers in a further aspect to a fibre and/or filament and/or film and/or threads and/or breathable film comprising the surface modified earth alkali carbonate-containing filler material as defined above.

The term "fiber" in the meaning of the present invention refers to a linear structure forming textile fabrics such as nonwovens which typically consist of fiber webs bonded together by e.g., mechanical methods. Accordingly, the term "fiber" is understood to refer to a finite structure.

The term "thread" in the meaning of the present invention refers to a linear structure forming textile fabrics such as nonwovens which typically consist of thread webs bonded together by e.g., mechanical methods. Accordingly, the term "thread" is understood to refer to a finite structure. The thread may be constructed as mono-, bi- or multi-thread. If a bi- or multi-thread is present, the composition of the single thread may be substantially the same. That is to say, the compositions of the single threads comprise substantially the same components, i.e., the at least one polymeric resin and surface modified earth alkali carbonate-containing filler material, in the same amounts. Alternatively, the composition of the single threads may be different. That is to say, the compositions of the single threads may comprise the same components, i.e., the at least one polymeric resin and surface modified earth alkali carbonate-containing filler material, in varying amounts or the compositions of the single threads may comprise different components, i.e., the at least one polymeric resin and/or surface modified earth alkali carbonate-containing filler material may be different, in the same amounts or the composition of the single threads may comprise different components, i.e., the at least one polymeric resin and surface modified earth alkali carbonate-containing filler material may be different, in varying amounts.

The term "filament" in the meaning of the present invention refers to a structure that differs from fibers by its structure length. Accordingly, the term "filament" is understood to refer to endless fibers. It is further appreciated that the filament may be constructed as mono-, bi- or multi-filament. If a bi- or multi-filament is present, the composition of the single filaments may be substantially the same. That is to say, the compositions of the single filaments comprise substantially the same components, i.e., the at least one polymeric resin and surface modified earth alkali carbonate-containing filler material, in the same amounts. Alternatively, the composition of the single filaments may be different. That is to say, the compositions of the single filaments may comprise the same components, i.e., the at least one polymeric resin and surface modified earth alkali carbonate-containing filler material, in varying amounts or the compositions of the single filaments may comprise different components, i.e., the at least one polymeric resin and/or surface modified earth alkali carbonate-containing filler material may be different, in the same amounts or the composition of the single filaments may comprise different components, i.e., the at least one polymeric resin and/or surface modified earth alkali carbonate-containing filler material may be different, in varying amounts.

The cross-section of the filaments and/or fibers and/or threads may have a great variety of shapes. It is preferred that the cross-sectional shape of the filaments and/or fibers and/or threads may be round, oval or n-gonal, wherein n is $\geq 3$, e.g., n is 3. For example, the cross-sectional shape of the filaments and/or fibers and/or threads is round or trilobal, like round. Additionally or alternatively, the cross-sectional shape of the filaments and/or fibers and/or threads is hollow.

It is appreciated that the filaments and/or fibers and/or threads may be prepared by all techniques known in the art used for preparing such filaments and/or fibers and/or threads. For example, the filaments and/or fibers and/or threads of the present invention can be prepared by the well known melt-blown process, spunbonded process or staple fibre production.

The terms "film" and "breathable film" in the meaning of the present invention refers to a structure that differs from filaments and/or fibers by its dimensional structure. Accordingly, the terms "film" and "breathable film" are understood to refer to a sheet.

It is appreciated that the films and/or breathable films may be prepared by all techniques known in the art used for preparing such films. For example, the films of the present invention can be prepared by the well known techniques used for preparing stretched/oriented films, and preferably extrusion coating films, blown films, technical blown films, monotapes, cast films and the like.

Accordingly, fibers and/or filaments and/or films and/or threads and/or breathable films according to the present invention are characterized in that they contain the inventive surface modified earth alkali carbonate-containing filler material and in that they have improved material properties such as improved mechanical properties.

Accordingly, the inventive surface modified earth alkali carbonate-containing filler material is thus advantageously implemented in a polymer composition comprising at least one polymeric resin and from 1.0 to 85.0 wt.-%, based on the total weight of the polymer composition, of the surface modified earth alkali carbonate-containing filler material.

The polymer composition comprises at least one polymeric resin. The polymer resin represents the backbone of the composition and provides strength, flexibility, toughness and durability to the final fiber and/or filament and/or film and/thread and/or breathable film.

It is appreciated that the at least one polymeric resin is not restricted to a specific resin material as long as the polymer composition is suitable for the preparation of fibers and/or filaments and/or films and/or threads and/or breathable films.

In one embodiment of the present invention, the at least one polymeric resin is at least one thermoplastic polymer. Thus, it is preferred that the at least one polymeric resin is a thermoplastic polymer selected from the group comprising homopolymers and/or copolymers of polyolefins, polyamides, halogen-containing polymers and/or polyesters.

For example, if the at least one polymeric resin is a polyamide the at least one polymeric resin is preferably nylon.

Additionally or alternatively, the at least one polymeric resin is a homopolymer and/or copolymer of a polyolefin. For example, the at least one polymeric resin is a homopolymer and a copolymer of a polyolefin. Alternatively, the at least one polymeric resin is a homopolymer or a copolymer of a polyolefin.

It is appreciated that the at least one polymeric resin is preferably a homopolymer of a polyolefin.

For example, the polyolefin can be polyethylene and/or polypropylene anti/or polybutylene. Accordingly, if the polyolefin is polyethylene, the polyolefin is selected from the group comprising homopolymers and/or copolymers of polyethylene like high-density polyethylene (HDPE), medium-density polyethylene (HDPE), low-density polyethylene (LDPE), very low-density polyethylene (VLDPE), linear low-density polyethylene (LLDPE).

For example, the polyolefin is a homopolymer and/or copolymer of polyethylene.

The expression homopolymer of polyethylene used in the present invention relates to polyethylene comprising a polyethylene that consists substantially, i.e., of more than 99.7 wt.-%, still more preferably of at least 99.8 wt.-%, based on the total weight of the polyethylene, of ethylene units. For example, only ethylene units in the homopolymer of polyethylene are detectable.

In case the at least one polymeric resin of the polymer composition comprises a copolymer of polyethylene, it is appreciated that the polyethylene contains units derivable from ethylene as major components. Accordingly, the copolymer of polyethylene comprises at least 55.0 wt.-% units derivable from ethylene, more preferably at least 60.0 wt.-% of units derived from ethylene, based on the total weight of the polyethylene. For example, the copolymer of polyethylene comprises 60.0 to 99.5 wt.-%, more preferably 90.0 to 99.0 wt.-%, units derivable from ethylene, based on the total weight of the polyethylene. The comonomers present in such copolymer of polyethylene are $C_3$ to $C_{10}$ α-olefins, preferably 1-butene, 1-hexene and 1-octene, the latter especially preferred.

Additionally or alternatively, the polyolefin is a homopolymer and/or copolymer of polypropylene.

The expression homopolymer of polypropylene as used throughout the instant invention relates to a polypropylene that consists substantially, i.e., of more than 99.0 wt.-%, still more preferably of at least 99.5 wt.-%, like of at least 99.8 wt.-%, based on the total weight of the polypropylene, of propylene units. In a preferred embodiment only propylene units are detectable in the homopolymer of polypropylene.

In case the at least one polymeric resin of the polymer composition comprises a copolymer of polypropylene, the polypropylene preferably contains units derivable from propylene as major components. The copolymer of polypropylene preferably comprises, preferably consists of, units derived from propylene and $C_2$ and/or at least one $C_4$ to $C_{10}$ α-olefin. In one embodiment of the present invention, the copolymer of polypropylene comprises, preferably consists of, units derived from propylene and at least one α-olefin selected from the group consisting of ethylene, 1-butene, 1-pentene, 1-hexene and 1-octene. For example, the copolymer of polypropylene comprises, preferably consists of, units derived from propylene and ethylene. In one embodiment of the present invention, the units derivable from propylene constitutes the main part of the polypropylene, i.e., at least 60.0 wt.-%, preferably of at least 70.0 wt.-%, more preferably of at least 80.0 wt.-%, still more preferably of from 60 to 99.0 wt.-%, yet more preferably of from 70.0 to 99.0 wt.-% and most preferably of from 80.0 to 99.0 wt.-%, based on the total weight of the polypropylene. The amount of units derived from $C_2$ and/or at least one $C_4$ to $C_{10}$ α-olefin in the copolymer of polypropylene, is in the range of 1.0 to 40.0 wt.-%, more preferably in the range of 1.0 to 30.0 wt.-% and most preferably in the range of 1.0 to 20.0 wt.-%, based on the total weight of the copolymer of polypropylene.

If the copolymer of polypropylene comprises only units derivable from propylene and ethylene, the amount of ethylene is preferably in the range of 1.0 to 20.0 wt.-%, preferably in the range of 1.0 to 15.0 wt.-% and most preferably in the range of 1.0 to 10.0 wt.-%, based on the total weight of the copolymer of polypropylene. Accordingly, the amount of propylene is preferably in the range of 80.0 to 99.0 wt.-%, preferably in the range of 85.0 to 99.0 wt.-% and most preferably in the range of 90.0 to 99.0 wt.-%, based on the total weight of the copolymer of polypropylene.

Additionally or alternatively, the polyolefin is a homopolymer and/or copolymer of polybutylene.

The expression homopolymer of polybutylene as used throughout the instant invention relates to a polybutylene that consists substantially, i.e., of more than 99.0 wt.-%, still more preferably of at least 99.5 wt.-%, like of at least 99.8 wt.-%, based on the total weight of the polybutylene, of butylene units. In a prefenred embodiment only butylene units are detectable in the homopolymer of polybutylene.

In case the at least one polymeric resin of the polymer composition comprises a copolymer of polybutylene, the polybutylene preferably contains units derivable from butylene as major components. The copolymer of polybutylene preferably comprises, preferably consists of, units derived from butylene and $C_2$ and/or $C_3$ and/or at least one $C_5$ to $C_{10}$ α-olefin. In one embodiment of the present invention, the copolymer of polybutylene comprises, preferably consists of, units derived from butylene and at least one α-olefin selected from the group consisting of ethylene, 1-butene, 1-pentene, 1-hexene and 1-octene. For example, the copolymer of polybutylene comprises, preferably consists of, units derived from butylene and ethylene. In one embodiment of the present invention, the units derivable from butylene constitutes the main part of the polybutylene, i.e., at least 60.0 wt.-%, preferably of at least 70.0 wt.-%, more preferably of at least 80.0 wt.-%, still more preferably of from 60.0 to 99.0 wt.-%, yet more preferably of from 70.0 to 99.0 wt.-% and most preferably of from 80.0 to 99.0 wt.-%, based on the total weight of the polybutylene. The amount of units derived from $C_2$ andlor $C_3$ and/or at least one $C_5$ to $C_{10}$ α-olefin in the copolymer of polybutylene, is in the range of 1.0 to 40.0 wt.-%, more preferably in the range of 1 to 30 wt.-% and most preferably in the range of 1.0 to 20.0 wt.-%, based on the total weight of the copolymer of polybutylene.

If the at least one polymeric resin is a homopolymer and/or copolymer of a halogen-containing polymer, the at least one polymeric resin is preferably selected from polyvinylchloride (PVC), polyvinylidene chloride (PVDC), polyvinylidene fluoride (PVDF) and polytetrafluoroethylene (PTFE).

If the at least one polymeric resin is a homopolymer and/or copolymer of polyester, the at least one polymeric resin is preferably selected from polyethylene terephthalate (PET), polytrimethylene terephthalate (M), recycled polyethylene terephthalate (PET), polybutylene terephthalate (PBT), polyethylene naphthalate (PEN), polycarbonate (PC), but also degradable polyesters, such as polylactic acid (polylactide, PLA).

In one embodiment of the present invention, the at least one polymeric resin is a homopolymer of polyethylene and/or polypropylene and/or polybutylene. For example, the at least one polymeric resin is a homopolymer of polyethylene and polypropylene. Alternatively, the at least one polymeric resin is a homopolymer of polyethylene or polypropylene. In one embodiment of the present invention, the at least one polymeric resin is a homopolymer of polypropylene.

The expression "at least one" polymeric resin means that one or more kinds of polymeric resin may be present in the polymer composition.

Accordingly, it is appreciated that the at least one polymeric resin may be a mixture of two or more kinds of polymeric resins. For example, if the at least one polymeric resin is a mixture of two or more polymeric resins, one polymeric resin is a homopolymer or copolymer of polypropylene, while the second or further polymeric resin is selected from the group comprising homopolymers and/or copolymers of polyethylene, polybutylene, polyamides, polyesters, halogen-containing polymers and mixtures thereof.

In one embodiment of the present invention, the at least one polymeric resin is one kind of polymeric resin. Preferably, the at least one polymeric resin is a polyester such as a polyethylene terephthalate (PET), recycled polyethylene terephthalate (PET), polybutylene terephthalate (PBT) and/or polycarbonate (PC).

A further essential component of the polymer composition is the surface modified earth alkali carbonate-containing filler material. With regard to the definition of the surface modified earth alkali carbonate-containing filler material and preferred embodiments thereof, reference is made to the comments provided above when discussing the surface modified earth alkali carbonate-containing filler material.

It is appreciated that the polymer composition preferably comprises the surface modified earth alkali carbonate-containing filler material in an amount of 1.0 to 85.0 wt.-%, based on the total weight of the polymer composition.

In one embodiment of the present invention, the polymer composition comprises the surface modified earth alkali carbonate-containing filler material in an amount of from 5.0 to 85.0 wt.-% and preferably from 10.0 to 85.0 wt.-%, based on the total weight of the polymer composition. For example, the polymer composition comprises the surface modified earth alkali carbonate-containing filler material in an amount of from 15.0 to 80.0 wt.-%, based on the total weight of the polymer composition.

In view of the very good results obtained with regard to the volatile onset temperature of the surface modified earth alkali carbonate-containing filler material, as defined above, a further aspect of the present invention is directed to the use of the surface modified earth alkali carbonate-containing filler material having a volatile onset temperature of ≥350° C., as defined above, in polyester products, such as products of polyethylene terephthalate (PET), recycled polyethylene terephthalate (PET), polybutylene terephthalate (PBT) and/or polycarbonate (PC). A still further aspect of the present invention is directed to the use of at least one polyhydrogensiloxane for increasing the hydrophobicity and/or decreasing the moisture pick up susceptibility of a surface modified earth alkali carbonate-containing filler material. With regard to the at least one polyhydrogensiloxane, it is referred to the definitions set out above when defining the at least one polyhydrogensiloxane. In one embodiment of the present invention, the at least one polyhydrogensiloxane is used for increasing the hydrophobicity and decreasing the moisture pick up susceptibility of a surface modified earth alkali carbonate-containing filler material.

Another aspect of the present invention is directed to an article comprising the surface modified earth alkali carbonate-containing filler material and/or the fibre and/or filament and/or film and/or thread and/or breathable film as defined above. The article is preferably selected from the group comprising hygiene products, medical and healthcare products, filter products, geotextile products, agriculture and horticulture products, clothing, footwear and baggage products, household and industrial products, packaging products, like PET beverage containers, construction products and the like.

Preferably, the hygiene products are selected from the group comprising absorbent hygiene products such as baby diapers or nappies, feminine hygiene, adult incontinence products, depilatory strips, bandages and wound dressings, disposable bath and face towels, disposable slippers and footwear, top sheets or coverstocks, consumer face masks, leg cuffs, acquisition/distribution layers, core wraps, back sheets, stretch ears, landing zones, dusting layers and fastening systems; and wipes such as wet wipes, skin care wipes, baby wipes, facial wipes, cleansing wipes, hand and body wipes, moist towelettes, personal hygiene wipes, feminine hygiene wipes, antibacterial wipes and medicated wipes.

Preferably, the medical and healthcare products are selected from the group comprising medical products which can be sterilized, medical packaging, caps like surgical disposable caps, protective clothing, surgical gowns, surgical masks and face masks, surgical scrub suits, surgical covers, surgical drapes, wraps, packs, sponges, dressings, wipes, bed linen, contamination control gowns, examination gowns, lab coats, isolation gowns, transdermal drug delivery, shrouds, underpads, procedure packs, heat packs, ostomy bag liners, fixation tapes, incubator mattress, sterilisation wraps (CSR wrap), wound care, cold/heat packs, drug delivery systems like patches.

Preferably, the filter products are selected from the group comprising gasoline filters, oil filters, air filters, water filters, coffee filters, tea bags, pharmaceutical industry filters, mineral processing filters, liquid cartridge and bag filters, vacuum bags, allergen membranes and laminates with nonwoven layers.

Preferably, the geotextile products are selected from the group comprising soil stabilizers and roadway underlayment, foundation stabilizers, erosion control, canals construction, drainage systems, geomembrane protection, frost protection, agriculture mulch, pond and canal water harriers, sand infiltration barrier for drainage tile and landfill liners.

Preferably, the agriculture and horticulture products are selected from the group comprising crop covers, plant protection, seed blankets, weed control fabrics, greenhouse shading, root control bags, biodegradable plant pots, capillary matting, and landscape fabric.

Preferably, the clothing, footwear and baggage products are selected from the group comprising interlinings like fronts of overcoats, collars, facings, waistbands, lapels etc., disposable underwear, shoe components like shoelace eyelet reinforcement, athletic shoe and sandal reinforcement and inner sole lining etc., bag components, bonding agents, composition and (wash) care labels.

Preferably, the packaging products are selected from the group comprising interlinings like desiccant packaging, sorbents packaging, gift boxes, file boxes, nonwoven bags, book covers, mailing envelopes, Express envelopes, courier bags and the like. As another example, the packaging products can be PET beverage containers.

Preferably, the household and industrial products are selected from the group comprising abrasives, bed linen like pocket cloth for pocket springs, separation layer, spring cover, top cover, quilt backing, duvet coverings, pillow cases etc., blinds/curtains, carpet/carpet backings like scatter rugs, carpet tiles, bath mats etc., covering and separation material, detergent pouches, fabric softener sheets, flooring, furniture/upholstery like inside lining, reverse fabric for cushions, dust cover, spring covering, pull strips etc., mops, table linen, tea and coffee bags, vacuum cleaning bags, wall-covering, wipes like household care wipes, floor care wipes, cleaning wipes, pet care wipes etc., automotive building, cable wrapping, civil engineering, filtration packaging, protective clothing, primary and secondary carpet backing, composites, marine sail laminates, tablecover laminates, chopped strand mats, backing/stabilizer for machine embroidery, packaging where porosity is needed, insulation like fiberglass batting, pillows, cushions, padding like upholstery padding, batting in quilts or comforters, consumer and medical face masks, mailing envelopes, tarps, tenting and transportation (lumber, steel) wrapping, disposable clothing like foot coverings and coveralls, and weather resistant house wraps.

Preferably, the construction products are selected from the group comprising house wrap, asphalt overlay, road and railroad beds, golf and tennis courts, wallcovering backings, acoustical wall coverings, roofing materials and tile underlayment, soil stabilizers and roadway underlayment, foundation stabilizers, erosion control, canals construction, drainage systems, geomembrane protection, frost protection, agriculture mulch, pond and canal water barriers, and sand infiltration barriers for drainage tile.

The following examples may additionally illustrate the invention but are not meant to restrict the invention to the exemplified embodiments. The examples below show the increased volatile onset temperature and the reduced moisture pick up susceptibility of the surface modified earth alkali carbonate-containing filler material according to the present invention:

EXAMPLES

Measurement Methods

The following measurement methods are used to evaluate the parameters given in the examples and claims.

Measurement of the Total Volatiles

For the purpose of the present application, the "total volatiles" associated with filler materials and evolved over a temperature range of 25 to 350° C. is characterized according to % mass loss of the filler material sample over a temperature range as read on a thermogravimetric (TGA) curve.

TGA analytical methods provide information regarding losses of mass and volatile onset temperatures with great accuracy, and is common knowledge; it is, for example, described in "Principles of instrumental analysis", fifth edition, Skoog, Holler, Nieman, 1998 (first edition 1992) in Chapter 31 pages 798 to 800, and in many other commonly known reference works. In the present invention, thermogravimetric analysis (TGA) is performed using a Mettler Toledo TGA 851 based on a sample of 500 +/−50 mg and scanning temperatures from 25 to 980° C. at a rate of 20° C./minute under an air flow of 80 ml/min.

The skilled man will be able to determine the "volatile onset temperature" by analysis of the TGA curve as follows: the first derivative of the TGA curve is obtained and the inflection points thereon between 150 and 600° C. are identified. Of the inflection points having a tangential slope value of greater than 45° relative to a horizontal line, the one having the lowest associated temperature above 200° C. is identified. The temperature value associated with this lowest temperature inflection point of the first derivative curve is the "volatile onset temperature".

The "total volatiles" evolved on the TGA curve is determined using $Star^e$ SW 9.01 software. Using this software, the curve is first normalised relative to the original sample weight in order to obtain mass losses in % values relative to the original sample. Thereafter, the temperature range of 25 to 350° C. is selected and the step horizontal (in German: "Stufe horizontal") option selected in order to obtain the % mass loss over the selected temperature range.

Particle Size Distribution (Mass % Particles with a Diameter<X) and Weight Median Diameter ($d_{50}$) of a Particulate Material As used herein and as generally defined in the art, the "$d_{50}$" value is determined based on measurements made by using a Sedigraph™ 5100 of Micromeritics Instrument Corporation (operating instrument software version 1.04) and is defined as the size at which 50% (the median point) of the particle volume or mass is accounted for by particles having a diameter equal to the specified value.

The method and the instrument are known to the skilled person and are commonly used to determine the particle size distribution of fillers and pigments. The measurement is carried out in an aqueous solution of 0.1 wt.-% $Na_4P_2O_7$ and 0.05 wt.-% of a low molecular weight sodium polyacrylate dispersant. The samples are dispersed using a high speed stirrer and supersonics.

BET Specific Surface Area of a Material

Throughout the present document, the specific surface area (in $m^2/g$) of the filler material is determined using the BET method (using nitrogen as adsorbing gas), which is well known to the skilled man (ISO 9277:1995). The total surface area (in $m^2$) of the filler material is then obtained by multiplication of the specific surface area and the mass (in g) of the filler material prior to treatment.

Moisture Pick-Up

The term "moisture pick-up susceptibility" in the meaning of the present invention refers to the amount of moisture absorbed on the surface of the filler material and is determined in mg moisture/g of the dry treated filler material product after exposure to an atmosphere of 10 and 85% of relative humidity, resp., for 2.5 hours at a temperature of +23° C. (±2° C.). The treated filler material product is first held at an atmosphere of 10% relative humidity for 2.5 hours, then the atmosphere is changed to 85% of relative humidity, where the sample is held for another 2.5 hours. The weight increase between 10% and 85% relative humidity is then used to calculate the moisture pick-up in mg moisture/g of dry treated filler material product.

Hydrophobicity

The "hydrophobicity" of a filler material product is evaluated at +23° C. by determining the minimum water to ethanol ratio in a volume/volume based water/ethanol-mixture needed for the settling of the majority of said filler material product, where said filler material product is deposited on the surface of said water/ethanol-mixture by passage through a house hold tea sieve. The volume/volume base is related to the volumes of both separate liquids before blending them together and do not include the volume contraction of the blend. The evaluation at +23° C. refers to a temperature of +23° C.±1° C.

A 8:2 volumetric ratio of a water/ethanol-mixture has typically a surface tension of 41 mN/m and a 6:4 volumetric ratio of a water/ethanol-mixture has typically a surface tension of 26 mN/m measured at +23° C. as described in the "Handbook of Chemistry and Physics", $84^{th}$ edition, David R. Lide, 2003 (first edition 1913).

Residual Total Moisture Content Measurement of Calcium Carbonate-Containing Filler Material The residual total moisture content of the earth alkali carbonate-containing filler material is measured according to the Karl Fischer coulometric titration method, desorbing the moisture in an oven at 220° C. and passing it continuously into the KF coulometer (Mettler Toledo coulometiic KF Titrator C30, combined with Mettler oven DO 0337) using dry $N_2$ at 100 ml/min for 10 min. A calibration curve using water has to be made and a blind of 10 min gas flow without a sample has to be taken in account.

Example 1

This example relates to the preparation of a surface modified calcium carbonate-containing filler material in accordance with the process of the present invention.

For the preparation of the surface modified calcium carbonate-containing filler material product, marble from Carrara, Italy was wet ground at 25 wt.-% in tap water in a horizontal ball mill (Dynomill) and spray dried. The obtained calcium carbonate-containing filler material features a $d_{50}$ of approximately 1.7 microns, a top cut ($d_{98}$) of 5.0 μm and a specific surface area of 4.1 m$^2$/g and a residual moisture content of 0.06 wt.-%.

The obtained spray dried calcium carbonate-containing tiller material was further treated as outlined in the following tests:

The aqueous emulsion of polyhydrogensiloxane as described in the examples below was prepared immediately before use. Prior addition to the carbonate the emulsion was intensively mixed by shaking.

Test 1 (Prior Art; PA1)

500 g of the spray dried calcium carbonate-containing filler material was added to an MTI Mixer (available from MTI Mischtechnik international GmbH) and the sample was activated for 10 minutes at 120° C. and 3 000 rpm. Thereafter, a 1:1 mixture (by weight) of dry stearic acid and dry palmitic acid powder was introduced to the mixer in a quantity such as indicated in Table 1. The contents of the mixer were mixed at 120° C. under a stirring speed of 3 000 rpm for a period of 10 minutes.

The obtained surface modified calcium carbonate-containing filler material was stored in a closed plastic bag. For analysis purposes the sample was taken out of the closed plastic bag and analyzed immediately. The results are presented in table 2.

Test 2 (Prior Art; PA2)

500 g of the spray dried calcium carbonate-containing filler material was heated overnight in an oven at 150° C. and directly added to an MTI Mixer (available from MTI Mischtechnik International GmbH) and the sample was activated for 10 minutes at 120° C. and 3 000 rpm. Thereafter, a blend of alkenyl succinic anhydrides having a purity of ≥96.5% (Cas number 68784-12-3; Hydrores AS 1000 of Kemira Oyj, Finland) was introduced to the mixer in a quantity such as indicated in Table 1. The contents of the mixer were mixed at 120° C. under a stirring speed of 3 000 rpm for a period of 10 minutes.

The obtained surface modified calcium carbonate-containing filler material was stored in a closed plastic bag. For analysis purposes the sample was taken out of the closed plastic bag and analyzed immediately. The results are presented in table 2.

Test 3 (Prior Art; PA3)

500 g of the spray dried calcium carbonate-containing filler material was added to an MTI Mixer (available from MTI Mischtechnik International GmbH) and the sample was activated for 10 minutes at 120° C. and 3 000 rpm. Thereafter, a mixture of 2-octyl-1-dodecan phosphoric acid mono ester and 2-octyl-1-dodecan phosphoric acid di ester (the ratio between mono-ester and di-ester is 45 mol-%: 55 mol-%) was introduced to the mixer in a quantity such as indicated in Table 1. The contents of the mixer were mixed at 120° C. under a stirring speed of 3 000 rpm for a period of 10 minutes.

The obtained surface modified calcium carbonate-containing filler material was stored in a closed plastic bag. For analysis purposes the sample was taken out of the closed plastic bag and analyzed immediately. The results are presented in table 2.

Test 4 (Prior Art; PA4)

500 g of the spray dried calcium carbonate-containing filler material was added to an MTI Mixer (available from MTI Mischtechnik International GmbH). Thereafter, octanoic acid (SIGMA-Aldrich order N°. O3907) was introduced to the mixer in a quantity such as indicated in Table 1. The contents of the mixer were mixed at 120° C. under a stirring speed of 3 000 rpm for a period of 10 minutes.

The obtained surface modified calcium carbonate-containing filler material was stored in a closed plastic bag. For analysis purposes the sample was taken out of the closed plastic bag and analyzed immediately. The results are presented in table 2.

Tests 5, 6 and 10 (Invention; IE1, IE2, IE6)

For each test, 500 g of the spray dried calcium carbonate-containing filler material was added to an MTI Mixer (available from MTI Mischtechnik International GmbH) and the sample was activated for 10 minutes at 120° C. and 3 000 rpm. Thereafter, an aqueous emulsion of 80 wt.-% of polymethylhydrogensiloxane (CAS #63148-57-2 or 9004-73-3, available as SILRES BS-94 from Wacker Chemie AG, Germany), based on the total weight of the emulsion, was introduced to the mixer in a quantity such as indicated in Table 1. The contents of the mixer were mixed at 120° C. under a stirring speed of 3 000 rpm for a period of 10 minutes.

The obtained surface modified calcium carbonate-containing filler materials were stored in a closed plastic bag.

For analysis purposes the samples were taken out of the closed plastic bag and analyzed immediately. The results are presented in table 2.

Test 7 (Invention; IE3)

500 g of the spray dried calcium carbonate-containing filler material was added to an MTI Mixer (available from MTI Mischtechnik International GmbH). Thereafter, a 50 wt.-% aqueous emulsion of polymethylhydrogensiloxane (available as SILRES BS-94 from Wacker Chemie AG, Germany), based on the total weight of the emulsion, was introduced to the mixer in a quantity such as indicated in Table 1. The contents of the mixer were mixed at 100° C. under a stirring speed of 3 000 rpm for a period of 10 minutes.

The obtained surface modified calcium carbonate-containing filler material was stored in a closed plastic bag. For analysis purposes the sample was taken out of the closed plastic bag and analysed immediately. The results are presented in table 2.

Test 8 (Invention; IE4)

500 g of the spray dried calcium carbonate-containing filler material was added to an MTI Mixer (available from MTI Mischtechnik International GmbH) and the sample was activated for 5 minutes at 120° C. and 3 000 rpm. Thereafter, a 98 wt.-% aqueous emulsion of polymethylhydrogensiloxane (available as SILRES BS-94 from Wacker Chemie AG, Germany), based on the total weight of the emulsion, was introduced to the mixer in a quantity such as indicated in Table 1. The contents of the mixer were mixed at 120° C. under a stirring speed of 3 000 rpm for a period of 10 minutes. Thereafter, 500 ppm of a polydimethylsiloxane (Dow Corning 200 Fluid 1000 CS) was added and the content was further mixed for 5 minutes at 120° C. and 3 000 rpm.

The obtained surface modified calcium carbonate-containing filler material was stored in a closed plastic bag. For analysis purposes the sample was taken out of the closed plastic bag and analysed immediately. The results are presented in table 2.

Test 9 (Invention; IE5)

500 g of the spray dried calcium carbonate-containing filler material was added to an MTI Mixer (available from MTI Mischtechnik International GmbH) and the sample was activated for 10 minutes at 120° C. and 3 000 rpm. Thereafter, a 80 wt.-% aqueous emulsion of polymethylhydrogensiloxane (available from Sigma Aldrich as order N° 81330; CAS N° 63148-57-2; Viscosity 15-40 mPa·s at 20° C.), based on the total weight of the emulsion, was introduced to the mixer in a quantity such as indicated in Table 1. The contents of the mixer were mixed at 120° C. under a stirring speed of 3 000 rpm for a period of 10 minutes.

The obtained surface modified calcium carbonate-containing filler material was stored in a closed plastic bag. For analysis purposes the sample was taken out of the closed plastic bag and analyzed immediately. The results are presented in table 2.

Test 11 (Invention; IE7)

500 g of the spray dried calcium carbonate-containing filler material was added to an MTI Mixer (available from MTI Mischtechnik International GmbH). Thereafter, a 80 wt.-% aqueous emulsion of polymethylhydrogensiloxane (available as SILRES BS-94 from Wacker Chemie AG, Germany), based on the total weight of the emulsion, was introduced to the mixer in a quantity such as indicated in Table 1. The contents of the mixer were mixed at 150° C. under a stirring speed of 3 000 rpm for a period of 10 minutes.

The obtained surface modified calcium carbonate-containing filler material was stored in a closed plastic bag. For analysis purposes the sample was taken out of the closed plastic bag and analysed immediately. The results are presented in table 2, Test 12 (Invention; IE8)

500 g of the spray dried calcium carbonate-containing filler material was added to an MTI Mixer (available from MTI Mischtechnik International GmbH) and the sample was activated for 10 minutes at 120° C. and 3000 rpm. Thereafter, an aqueous emulsion of 80 wt.-% of polymethylhydrogensiloxane (CAS #63148-57-2 or 9004-73-3, available as SILRES BS-94 from Wacker Chemie AG, Germany) and octanoic acid (available from SIGMA-Aldrich under order N°. O3907) were introduced to the mixer in a quantity such as indicated in Table 1. The contents of the mixer were mixed at 120° C. under a stirring speed of 3 000 rpm for a period of 10 minutes.

The obtained surface modified calcium carbonate-containing filler material was stored in a closed plastic bag. For analysis purposes the sample was taken out of the closed plastic bag and analyzed immediately. The results are presented in table 2.

TABLE 1

|  | PA1 | PA2 | PA3 | PA4 | IE1 | IE2 | IE3 | IE4 | IE5 | IE6 | IE7 | IE8 |
|---|---|---|---|---|---|---|---|---|---|---|---|---|
| Test | 1 | 2 | 3 | 4 | 5 | 6 | 7 | 8 | 9 | 10 | 11 | 12 |
| treatment level [wt.-%] | 1.0 | 0.5 | 0.8 | 1.0 | 0.5 | 0.6 | 1.5 | 1.2 | 1.1 | 3.0 | 1.2 | 0.5*<br>0.1# |
| treatment time+/temperature ([min]/[° C.]) | 10/120 | 10/120 | 10/120 | 10/120 | 10/120 | 10/120 | 10/100 | 15/120 | 10/120 | 10/120 | 10/150 | 10/120 |

+refers to the total treatment time of the calcium carbonate-containing filler material with the polyhydrogensiloxane
*refers to the amount of polyhydrogensiloxane.
refers to the amount of and octanoic acid.

The results for the analysis of the surface modified calcium carbonate-containing filler material as described above are outlined in table 2.

TABLE 2

| | PA1 | PA2 | PA3 | PA4 | IE1 | IE2 | IE3 | IE4 | IE5 | IE6 | IE7 | IE8 |
|---|---|---|---|---|---|---|---|---|---|---|---|---|
| Test | 1 | 2 | 3 | 4 | 5 | 6 | 7 | 8 | 9 | 10 | 11 | 12 |
| Moisture pick-up [mg/g] | 0.4 | 0.4 | 0.6 | 0.3 | 1.0 | 1.0 | 0.8 | 0.6 | 0.9 | 0.8 | 0.9 | 0.9 |
| Volatile onset temperature [° C.] | 293 | 302 | 278 | 278 | >500 | >500 | >500 | >500 | >500 | >500 | >500 | >500 |
| Hydrophobicity [vol/vol-%] | 50 | 75 | 65 | — | 75 | 60 | 70 | — | 55 | 50 | 50 | 50 |

From the data given in Table 2, it can be gathered that the surface modified calcium carbonate-containing filler material of the present invention shows excellent properties. In particular, it is shown that the surface modified calcium carbonate-containing filler material of the present invention has a volatile onset temperature of ≥350° C. and a low moisture pick up susceptibility of less than 1.2 mg/g at high hydrophobicity.

The invention claimed is:

1. A process for preparing a surface modified earth alkali carbonate-containing filler material, the process comprising the steps of:
   a) providing a dry earth alkali carbonate-containing filler material comprising calcium carbonate;
   b) providing in the form of an aqueous emulsion a polyhydrogensiloxane consisting of a compound of the following Formula I:

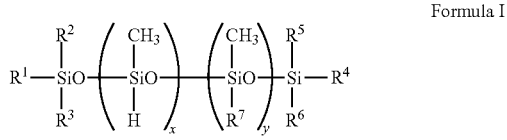

Formula I wherein x >y, and x+y is in the range from 5 to 200; $R^1$, $R^2$, $R^3$, $R^4$, $R^5$ and $R^6$ are independently from each other hydrogen or a saturated linear or branched alkyl group having 1 to 6 carbon atoms and $R^7$ is hydrogen or a methyl group, and wherein the polyhydrogensiloxane has a number average molecule weight ($M_n$) of from 1000 to 10,000 g/mol,
   c) contacting the earth alkali carbonate-containing filler material of step a), in one or more steps at a temperature of from 40 to 200° C., with the polyhydrogensiloxane of step b) such that the total amount of the polyhydrogensiloxane added is from 0.7 to 6.0 mg/m², based on the earth alkali carbonate-containing filler material of step a), and
   d) forming a treatment layer comprising the polyhydrogensiloxane of step b) and reaction products thereof on at least a part of the surface of the earth alkali carbonate-containing filler material of step a) to obtain a surface modified earth alkali carbonate-containing filler material having a volatile onset temperature of ≥350° C.

2. The process according to claim 1, wherein the surface modified earth alkali carbonate-containing filler material obtained in step d) has a volatile onset temperature of ≥450° C.

3. The process according to claim 1, wherein the surface modified earth alkali carbonate-containing filler material obtained in step d) has a moisture pick up susceptibility of from 1.2 to 0.1 mg/g.

4. The process according to claim 1, wherein the polyhydrogensiloxane of step b) is provided in form of an aqueous emulsion comprising the polyhydrogensiloxane in an amount of from 20.0 to 99.0 wt.-%, based on the total weight of the aqueous emulsion.

5. The process according to claim 1, wherein the polyhydrogensiloxane of step b) is provided in form of an aqueous emulsion comprising the polyhydrogensiloxane in an amount of from 40.0 to 98.0 wt.-%, based on the total weight of the aqueous emulsion.

6. The process according to claim 1, wherein the polyhydrogensiloxane of step b) is provided in form of an aqueous emulsion comprising the polyhydrogensiloxane in an amount of from 50.0 to 95.0 wt.-%, based on the total weight of the aqueous emulsion.

7. The process according to claim 1, wherein the earth alkali carbonate-containing filler material of step a) is preheated before contacting step c) is carried out.

8. The process according to claim 1, wherein the earth alkali carbonate-containing filler material of step a) is preheated at a temperature of from 40 to 200° C. before contacting step c) is carried out.

9. The process according to claim 1, wherein the earth alkali carbonate-containing filler material of step a) is preheated at a temperature of from 50 to 180° C. before contacting step c) is carried out.

10. The process according to claim 1, wherein the earth alkali carbonate-containing filler material of step a) is preheated at a temperature of from 60 to 150° C. before contacting step c) is carried out.

11. The process according to claim 1, wherein the earth alkali carbonate-containing filler material of step a) is preheated at a temperature of from 60 to 120° C. before contacting step c) is carried out.

12. The process according to claim 1, wherein contacting step c) is carried out at a temperature of from 50 to 180° C.

13. The process according to claim 1, wherein contacting step c) is carried out at a temperature of from 60 to 150° C.

14. The process according to claim 1, wherein contacting step c) is carried out at a temperature of from 60 to 120° C.

15. A fibre, filament, film, thread or breathable film comprising the surface modified earth alkali carbonate-containing filler material prepared according to the process of claim 1.

16. An article comprising the fibre, filament, film, thread or breathable film according to claim 15.

17. The article according to claim 16, which is selected from the group consisting of a hygiene product, a medical product, a healthcare product, a filter product, a geotextile product, an agriculture product, a horticulture product, a clothing product, a footwear product, a baggage product, a household product, an industrial product, a packaging product, a polyethylene terephthalate (PET) beverage container, a construction product, a polyester product, a product containing polyethylene terephthalate (PET), a product containing recycled polyethylene terephthalate (PET), a product containing polybutylene terephthalate (PBT), and a product containing polycarbonate (PC).

18. An article comprising the surface modified earth alkali carbonate-containing filler material prepared according to the process of claim 1.

19. The article according to claim 18, which is selected from the group consisting of a hygiene product, a medical product, a healthcare product, a filter product, a geotextile product, an agriculture product, a horticulture product, a clothing product, a footwear product, a baggage product, a household product, an industrial product, a packaging product, a polyethylene terephthalate (PET) beverage container, a construction product, a polyester product, a product containing polyethylene terephthalate (PET), a product containing recycled polyethylene terephthalate (PET), a product containing polybutylene terephthalate (PBT), and a product containing polycarbonate (PC).

* * * * *